United States Patent
Su et al.

(10) Patent No.: US 11,716,409 B2
(45) Date of Patent: Aug. 1, 2023

(54) PACKET TRANSMISSION METHOD AND APPARATUS

(71) Applicant: Huawei Technologies Co., Ltd., Shenzhen (CN)

(72) Inventors: Dexian Su, Shenzhen (CN); Hua Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/895,791

(22) Filed: Jun. 8, 2020

(65) Prior Publication Data
US 2020/0304608 A1    Sep. 24, 2020

Related U.S. Application Data

(63) Continuation of application No. PCT/CN2018/072886, filed on Jan. 16, 2018.

(51) Int. Cl.
| | | |
|---|---|---|
| H04L 69/22 | (2022.01) | |
| H04L 47/34 | (2022.01) | |
| H04L 12/46 | (2006.01) | |
| H04L 43/0829 | (2022.01) | |
| H04L 49/90 | (2022.01) | |
| H04L 69/16 | (2022.01) | |

(52) U.S. Cl.
CPC .......... *H04L 69/22* (2013.01); *H04L 12/4633* (2013.01); *H04L 43/0829* (2013.01); *H04L 47/34* (2013.01); *H04L 49/90* (2013.01); *H04L 69/16* (2013.01)

(58) Field of Classification Search
CPC ............... G06F 9/5016; G06F 13/4022; H04L 12/4633; H04L 43/0829; H04L 47/34; H04L 49/70; H04L 49/109; H04L 69/16; H04L 69/22; H04L 45/48
USPC ................................ 370/235, 389, 392, 412
See application file for complete search history.

(56) References Cited

U.S. PATENT DOCUMENTS

| | | | |
|---|---|---|---|
| 2002/0184392 A1 | 12/2002 | Parthasarathy et al. | |
| 2004/0049601 A1 | 3/2004 | Boyd et al. | |
| 2007/0115982 A1 | 5/2007 | Pope et al. | |
| 2008/0043732 A1* | 2/2008 | Desai | H04L 49/109 370/389 |
| 2009/0077567 A1* | 3/2009 | Craddock | G06F 13/4022 719/314 |
| 2010/0082766 A1 | 4/2010 | Dreier | |
| 2015/0006749 A1* | 1/2015 | Hendel | H04L 47/34 709/230 |
| 2015/0317280 A1 | 11/2015 | Magro et al. | |
| 2017/0139644 A1* | 5/2017 | White | G06F 9/5016 |
| 2017/0295100 A1* | 10/2017 | Hira | H04L 69/22 |

(Continued)

FOREIGN PATENT DOCUMENTS

| | | |
|---|---|---|
| CN | 1640089 A | 7/2005 |
| CN | 101227287 A | 7/2008 |

(Continued)

*Primary Examiner* — Harun Chowdhury
(74) *Attorney, Agent, or Firm* — Conley Rose, P.C.

(57) ABSTRACT

In a packet transmission method and an apparatus for implementing the method, packets in different groups have different source port information, and a header carried in each packet carries a write address of the packet in a memory in a destination server. In this way, the to-be-sent packets are forwarded on different paths.

26 Claims, 18 Drawing Sheets

(56) References Cited

U.S. PATENT DOCUMENTS

| | | | |
|---|---|---|---|
| 2018/0131617 A1* | 5/2018 | Hira | H04L 49/70 |
| 2018/0367449 A1* | 12/2018 | Pani | H04L 45/48 |
| 2019/0391954 A1 | 12/2019 | Cherian et al. | |

FOREIGN PATENT DOCUMENTS

| | | |
|---|---|---|
| CN | 101409715 A | 4/2009 |
| CN | 101702689 A | 5/2010 |
| CN | 103441937 A | 12/2013 |
| CN | 105025070 A | 11/2015 |
| CN | 106411739 A | 2/2017 |
| CN | 107113298 A | 8/2017 |
| CN | 107231316 A | 10/2017 |
| WO | 2005099375 A2 | 10/2005 |

* cited by examiner

| Layer 2 Ethernet header | IP header | UDP header | Base transport header | RDMA extended transport header/ Extended header | Payload | Constant cyclic redundancy check | Frame check |

FIG. 8

PACKET TRANSMISSION METHOD AND APPARATUS

CROSS-REFERENCE TO RELATED APPLICATIONS

This is a continuation of Int'l Patent App. No. PCT/CN2018/072886 filed on Jan. 16, 2018, which is incorporated by reference.

TECHNICAL FIELD

The present disclosure relates to the field of packet transmission technologies, and in particular, to a packet transmission method and apparatus.

BACKGROUND

In a data communications system, a remote direct memory access (RDMA) technology is usually used for connection to increase a speed of packet transmission between servers. RDMA is used to directly transmit data to a storage area of a computer through a network, and quickly move the data from a system to a remote system memory without affecting an operating system. As such, overheads of external memory replication and context switching are eliminated in RDMA, to free up memory bandwidth and a central processing unit (CPU) cycle to improve application system performance.

As one kind of RDMA technology, RDMA over Converged Ethernet (RoCE) allows a server to perform remote direct memory access through Ethernet. Currently, RoCE has two protocol versions: v1 and v2. The RoCE v1 protocol allows direct access to any two servers in a same broadcast domain. The RoCE v2 protocol can implement a routing function. Although a main advantage of the RoCE protocol lies in a characteristic over converged Ethernet, the RoCE protocol may also be applied to a conventional Ethernet network or a non-converged Ethernet network.

When a packet in the RoCEv2 protocol is transmitted in a multipath network, a forwarding path is usually selected based on a hash value of 5-tuple information in the packet to implement traffic balancing. However, according to a fast-start characteristic of the RoCEv2 protocol, traffic of a packet sent by a source end port may be relatively heavy in a period of time. In addition, due to randomness of hashing, a path in the multipath network may have relatively heavy traffic at a moment, resulting in congestion of the path in the multipath network. When network congestion occurs, a network delay increases, and a possibility of a packet loss in the network also increases, resulting in a decrease in effective bandwidth for network transmission. Therefore, path balancing for network routing in the RoCE protocol needs to be further optimized.

SUMMARY

Embodiments of this disclosure provide a packet transmission method, so that a packet using the RoCE protocol can implement more balanced route transmission in Ethernet.

According to a first aspect, a packet transmission method is applied to a data communications system. A source end device and a destination end device in the data communications system perform remote direct memory access RDMA through Ethernet. A network interface card of the source end device includes at least a source queue pair, and the source queue pair includes a send queue. The packet transmission method includes: obtaining Q data segments from the send queue of the source queue pair; and separately encapsulating the Q data segments to obtain Q packets, and separately sending the Q packets, where each of the Q packets carries a first header and a second header, the first header carried in each packet is used to indicate a write address of the packet in a memory of the destination end device, the second header carried in each packet includes source port number information, source port number information in second headers separately carried in at least two of the Q packets is different, and Q is a positive integer greater than or equal to 2.

In the foregoing solution, because the source port number information in the second headers carried in the at least two packets is different, when a router selects a path based on a hash value of a 5-tuple information, the group of packets are transmitted on at least two different network paths, so that traffic on each path in a network is relatively balanced. In addition, because packets in the same group are transmitted on different transmission paths, the destination end may receive a group of out-of-order packets. In the foregoing solution, a packet carries a first header indicating a write address of the packet in the memory of the destination end, so that the destination end device can directly perform an RDMA operation based on address information carried in each packet. Therefore, in the foregoing solution, routing of a packet on which an RDMA operation is performed can be further optimized and the RDMA operation can be really implemented at the destination end.

In a possible implementation of the first aspect, the Q data segments are successively encapsulated based on source port number information configured for the source queue pair, to obtain the Q packets; each time encapsulation of one packet is completed, an encapsulated packet is sent; and each time encapsulation of N packets is completed, the source port number information configured for the source queue pair is updated, where source port number information carried in a previous group of N packets is different from source port number information carried in a current group of N packets, and N is greater than or equal to 1 and less than Q. In the foregoing manner, each time one packet is encapsulated, the packet is sent, so that system efficiency can be improved.

In another possible implementation of the first aspect, the Q data segments are classified into M groups, where each group includes at least one data segment; and data segments in each group are successively encapsulated to obtain packets in each group, where the packets in each group carry same source port number information, and packets in at least two groups carry different source port number information. In the foregoing method for performing encapsulation through grouping, system efficiency can be improved.

In another possible implementation of the first aspect, before the separately encapsulating the Q data segments to obtain Q packets, the method further includes: determining the write address of each of the Q packets in the memory of the destination end device based on a base address of a first data segment in the Q data segments and a length of each data segment. The write address of each packet in the memory of the destination end device is calculated and the address is encapsulated into the packet, so that when the packet arrives at the destination end, the packet can be directly written into the corresponding address in the memory.

In another possible implementation of the first aspect, each of the Q packets further carries a packet sequence number, and the packet sequence number carried in each packet is used to indicate a sending order of the packet in the Q packets. In this way, it is convenient for the destination end to determine, based on packet sequence numbers, whether the packets in the group are all received or perform out-of-order resequencing on the packets, thereby improving system stability.

According to a second aspect, a packet transmission method is provided, and the method is applied to a data communications system. A source end device and a destination end device in the data communications system perform remote direct memory access RDMA through Ethernet. A network interface card of the destination end device includes a destination queue pair, and the destination queue pair includes a receive queue. The packet transmission method includes: receiving Q packets, where each packet carries a first header and a second header, the first header carried in each packet is used to indicate a write address of the packet in a memory of the destination end device, the second header carried in each packet includes source port number information, source port number information in second headers carried in at least two of the Q packets is different, and Q is a positive integer greater than or equal to 2; and separately storing the Q packets from the destination queue pair in the memory of the destination end device based on the write address of each of the Q packets in the memory of the destination end device.

Because a group of packets sent by the source end may be routed through different transmission paths in a multipath network, an order of arriving at the destination end may be different from an order of sending by the source end. After receiving the packets sent by the source end, the destination end directly writes the packets into the memory based on write addresses carried in the packets, instead of waiting for the entire group of packets to be received and then to be re-sequenced before writing the packets into the memory, thereby improving system efficiency. In addition, a problem that if a packet loss occurs in a group of packets during transmission, the entire group of packets may not be written into the memory of the destination end is avoided.

In a possible implementation of the second aspect, the receiving Q packets includes: successively receiving the Q packets; and the storing the Q packets in the memory of the destination end device includes: each time one packet is received, storing the received packet in the memory of the destination end device. In this way, corresponding processing can be performed each time one packet is received, thereby improving system efficiency.

In another possible implementation of the second aspect, each of the Q packets further carries a packet sequence number, and the packet sequence number carried in each packet is used to indicate a sending order of the packet in the Q packets. This implementation further includes: recording, each time one packet is received, a packet sequence number carried in the currently received packet, and determining a packet sequence number of a next to-be-received packet based on the packet sequence number of the currently received packet; after a next packet is received, determining whether a packet sequence number of the next received packet is consistent with the packet sequence number of the next to-be-received packet, and if no, starting a packet loss detection procedure; and sending a packet retransmission instruction to the source end device if it is determined, through the packet loss detection procedure, that a packet loss occurs in a packet transmission process. In this way, when a case such as an out-of-order situation or a packet loss occurs, corresponding packet loss detection is started, instead of sending the retransmission instruction to the source end immediately. When it is determined, through packet loss detection, that a packet loss occurs, the source end is instructed to perform packet retransmission, thereby improving system stability.

In another possible implementation of the second aspect, a bitmap is configured for the destination queue pair, the bitmap includes at least Q bitmap bits, the Q bitmap bits correspond to the Q packets in front-to-back sending orders of the Q packets, a head pointer and a tail pointer are configured for the bitmap, the head pointer points to a bitmap bit corresponding to a latest received packet in the receive queue, and the tail pointer points to a next to-be-received packet in the receive queue; and the recording, each time one packet is received, a packet sequence number carried in the currently received packet, and determining a packet sequence number of a next to-be-received packet based on the packet sequence number of the currently received packet includes: setting, based on the packet sequence number of the currently received packet, a bitmap bit representing the currently received packet in the bitmap to be valid, and enabling the head pointer to point to the bitmap bit representing the currently received packet; and determining, based on the packet sequence number of the currently received packet, whether the currently received packet is a packet corresponding to a bitmap bit to which the tail pointer currently points, and if yes, updating a pointing direction of the tail pointer, where the tail pointer is redirected to a first bitmap bit in invalid bitmap bits following the bitmap bit corresponding to the currently received packet; or if no, keeping the bitmap bit to which the tail pointer currently points unchanged. In this way, the bitmap is used to count statuses of the received packets, thereby improving system efficiency.

In another possible implementation of the second aspect, the determining whether a packet sequence number of the next received packet is consistent with the packet sequence number of the next to-be-received packet includes: determining, based on the packet sequence number of the next received packet, whether the tail pointer currently points to a bitmap bit corresponding to the next received packet. In this way, it can be determined whether the received packets are out of order, and then it is determined whether to take a corresponding measure.

In another possible implementation of the second aspect, the packet loss detection procedure includes: starting a timer for the packet corresponding to the bitmap bit to which the tail pointer currently points, and if the pointing direction of the tail pointer does not change after the timer expires, determining that the packet corresponding to the bitmap bit to which the tail pointer currently points is lost. In this way, when a packet fails to be received all the time, the system may determine that the packet is lost, thereby improving system efficiency.

In another possible implementation of the second aspect, the packet loss detection procedure includes: determining whether a bitmap bit to which the head pointer currently points exceeds a predetermined value, and if yes, determining that a packet corresponding to a bitmap bit between the head pointer and the tail pointer is lost. In this way, it can be effectively determined whether a packet loss occurs in the received packets.

In another possible implementation of the second aspect, the sending a packet retransmission instruction to the source end device includes: sending the packet retransmission instruction to the source end device to request the source end device to resend all packets following the packet corresponding to the bitmap bit to which the tail pointer currently points in the Q packets, where the retransmission instruction carries a packet sequence number of the packet corresponding to the bitmap bit to which the tail pointer currently points. In this way, the source end needs to retransmit only all the packets following the packet corresponding to the bitmap bit to which the tail pointer currently points, thereby improving system efficiency.

In another possible implementation of the second aspect, when values of bitmap bits corresponding to a group of packets are all set to be valid, it indicates that the packets in the group are all received, and the destination end sends an acknowledgement packet to the source end. In this way, a time at which a group of packets are all received can be determined.

In another possible implementation of the second aspect, when a packet received by the destination end does not carry a part indicating a write address of the packet at the destination end, the packet is cached first, and it is determined whether an out-of-order situation or a packet lost occurs in the packets and whether the packets are all received. After it is determined that the entire group of packets are all received, out-of-order resequencing is performed based on packet sequence numbers of the packets, and the packets are written into the memory after the out-of-order resequencing. In this way, the packet that does not carry the part indicating the write address of the packet at the destination end can be received, and out-of-order resequencing can be performed.

According to a third aspect, a network interface card is provided. The network interface card is located at a source end device that performs remote direct memory access RDMA, a source queue pair is configured on the network interface card, and the source queue pair includes a send queue. The network interface card includes: an obtaining module configured to obtain Q data segments from the send queue of the source queue pair; and a sending module configured to: encapsulate the Q data segments to obtain Q packets, and send the Q packets, where each of the Q packets carries a first header, a second header, and a queue pair identifier, the first header carried in each packet is used to indicate a write address of the packet in a memory of a destination end device, the second header carried in each packet includes source port number information, source port number information in second headers carried in at least two of the Q packets is different, and Q is a positive integer greater than or equal to 2.

In a possible implementation of the third aspect, the sending module is further configured to: successively encapsulate the Q data segments based on source port number information configured for the source queue pair, to obtain the Q packets; each time encapsulation of one packet is completed, send an encapsulated packet; and each time encapsulation of N packets is completed, update the source port number information configured for the source queue pair, where source port number information carried in a previous group of N packets is different from source port number information carried in a current group of N packets, and N is greater than or equal to 1 and less than Q.

In another possible implementation of the third aspect, the sending module is further configured to: classify the Q data segments into M groups, where each group includes at least one data segment; and successively encapsulate data segments in each group to obtain packets in each group, where the packets in each group carry same source port number information, packets in at least two groups carry different source port number information, and M is less than or equal to Q.

In another possible implementation of the third aspect, the network interface card further includes a determining module configured to determine the write address of each of the Q packets in the memory of the destination end device based on a base address of a first data segment in the Q data segments and a length of each data segment.

In another possible implementation of the third aspect, each of the Q packets further carries a packet sequence number, and the packet sequence number carried in each packet is used to indicate a sending order of the packet in the Q packets.

According to a fourth aspect, a device is provided, and the device includes a main processing system and a network interface card. The main processing system is configured to: process a service, and when service data needs to be sent to a destination end device, send the service data to a send queue of a source queue pair corresponding to service data in the network interface card. The network interface card is configured to: obtain Q data segments from the send queue of the source queue pair corresponding to the service data, where the Q data segments belong to the service data; encapsulate the Q data segments to obtain Q packets, and send the Q packets, where each of the Q packets carries a first header and a second header, the first header carried in each packet is used to indicate a write address of the packet in a memory of the destination end device, the second header carried in each packet includes source port number information, source port number information in second headers carried in at least two of the Q packets is different, and Q is a positive integer greater than or equal to 2.

In a possible implementation of the fourth aspect, that the network interface card encapsulates the Q data segments to obtain the Q packets, and sends the Q packets includes: successively encapsulating the Q data segments based on source port number information configured for the source queue pair, to obtain the Q packets; each time encapsulation of one packet is completed, sending an encapsulated packet; and each time encapsulation of N packets is completed, updating the source port number information configured for the source queue pair, where source port number information carried in a previous group of N packets is different from source port number information carried in a current group of N packets, and N is greater than or equal to 1 and less than Q.

In another possible implementation of the fourth aspect, that the network interface card encapsulates the Q data segments to obtain the Q packets, and sends the Q packets includes: classifying the Q data segments into M groups, where each group includes at least one data segment; and successively encapsulating data segments in each group to obtain packets in each group, where the packets in each group carry same source port number information, and packets in at least two groups carry different source port number information.

In another possible implementation of the fourth aspect, the network interface card is further configured to determine the write address of each of the Q packets in the memory of the destination end device based on a base address of a first data segment in the Q data segments and a length of each data segment.

In another possible implementation of the fourth aspect, when the network interface card encapsulates the Q packets, each of the Q packets further carries a packet sequence number, and the packet sequence number carried in each packet is used to indicate a sending order of the packet in the Q packets.

According to a fifth aspect, a network interface card is provided. The network interface card is located at a destination end device that performs remote direct memory access RDMA, a destination queue pair is configured on the network interface card, and the destination queue pair includes a receive queue. The network interface card includes: a receiving module configured to receive Q packets, where each packet carries a first header and a second header, the first header carried in each packet is used to indicate a write address of the packet in a memory of the destination end device, the second header carried in each packet includes source port number information, source port number information in second headers carried in at least two of the Q packets is different, Q is a positive integer greater than or equal to 2, and the destination end device is a destination end device that performs RDMA; and an execution module configured to separately store the Q packets from the destination queue pair in the memory of the destination end device based on the write address of each of the Q packets in the memory of the destination end device.

In a possible implementation of the fifth aspect, the receiving module is further configured to successively receive the Q packets; and each time the receiving module receives one packet, the execution module stores the received packet in the memory of the destination end device.

In another possible implementation of the fifth aspect, each of the Q packets further carries a packet sequence number, and the packet sequence number carried in each packet is used to indicate a sending order of the packet in the Q packets; and the network interface card further includes a detection module configured to: each time the receiving module receives one packet, record a packet sequence number carried in the currently received packet, and determine a packet sequence number of a next to-be-received packet based on the packet sequence number of the currently received packet; after a next packet is received, determine whether a packet sequence number of the next received packet is consistent with the packet sequence number of the next to-be-received packet, and if no, start a packet loss detection procedure; and send a packet retransmission instruction to a source end device if it is determined, through the packet loss detection procedure, that a packet loss occurs in a packet transmission process.

In another possible implementation of the fifth aspect, a bitmap is configured for the destination queue pair, the bitmap includes at least Q bitmap bits, the Q bitmap bits correspond to the Q packets in sending orders of the Q packets, a head pointer and a tail pointer are configured for the bitmap, the head pointer points to a bitmap bit corresponding to a latest received packet in the receive queue of the destination queue pair, and the tail pointer points to a next to-be-received packet in the receive queue of the destination queue pair; and the detection module is further configured to: set, based on the packet sequence number of the currently received packet, a bitmap bit representing the currently received packet in the bitmap to be valid, and enable the head pointer to point to the bitmap bit representing the currently received packet; and determine, based on the packet sequence number of the currently received packet, whether the currently received packet is a packet corresponding to a bitmap bit to which the tail pointer currently points, and if yes, update a pointing direction of the tail pointer, where the tail pointer is redirected to a first bitmap bit in invalid bitmap bits following the bitmap bit corresponding to the currently received packet; or if no, keep the bitmap bit to which the tail pointer currently points unchanged.

In another possible implementation of the fifth aspect, that the detection module determines whether the packet sequence number of the next received packet is consistent with the packet sequence number of the next to-be-received packet includes: determining, based on the packet sequence number of the next received packet, whether the tail pointer currently points to a bitmap bit corresponding to the next received packet. In another possible implementation of the fifth aspect, that the detection module executes the packet loss detection procedure specifically includes: starting a timer for the packet corresponding to the bitmap bit to which the tail pointer currently points, and if the pointing direction of the tail pointer does not change after the timer expires, determining that the packet corresponding to the bitmap bit to which the tail pointer currently points is lost.

In another possible implementation of the fifth aspect, that the detection module executes the packet loss detection procedure specifically includes: determining whether a bitmap bit to which the head pointer currently points exceeds a predetermined value, and if yes, determining that a packet corresponding to a bitmap bit between the head pointer and the tail pointer is lost.

In another possible implementation of the fifth aspect, that the detection module sends the packet retransmission instruction to the source end device includes: sending the packet retransmission instruction to the source end device to request the source end device to resend all packets following the packet corresponding to the bitmap bit to which the tail pointer currently points in the Q packets, where the retransmission instruction carries a packet sequence number of the packet corresponding to the bitmap bit to which the tail pointer currently points.

According to a sixth aspect, a device is provided, and the device includes a main processing system and a network interface card. The main processing system is configured to: obtain application data from a memory of the device, and process a service based on the application data. The network interface card is configured to: receive Q packets, where each packet carries a first header and a second header, the first header carried in each packet is used to indicate a write address of the packet in a memory of a destination end device, the second header carried in each packet includes source port number information, source port number information in second headers carried in at least two of the Q packets is different, and Q is a positive integer greater than or equal to 2; and separately store the Q packets from a destination queue pair in the memory of the destination end device based on the write address of each of the Q packets in the memory of the destination end device.

In a possible implementation of the sixth aspect, that the network interface card receives the Q packets includes: successively receiving the Q packets; and the storing the Q packets in the memory of the destination end device includes: each time one packet is received, storing the received packet in the memory of the destination end device.

In another possible implementation of the sixth aspect, each of the Q packets further carries a packet sequence number, and the packet sequence number carried in each packet is used to indicate a sending order of the packet in the Q packets. This implementation further includes: recording, each time one packet is received, a packet sequence number carried in the currently received packet, and determining a packet sequence number of a next to-be-received packet based on the packet sequence number of the currently received packet; after a next packet is received, determining whether a packet sequence number of the next received packet is consistent with the packet sequence number of the next to-be-received packet, and if no, starting a packet loss detection procedure; and sending a packet retransmission instruction to a source end device if it is determined, through the packet loss detection procedure, that a packet loss occurs in a packet transmission process.

In another possible implementation of the sixth aspect, a bitmap is configured for the destination queue pair, the bitmap includes at least Q bitmap bits, the Q bitmap bits correspond to the Q packets in front-to-back sending orders of the Q packets, a head pointer and a tail pointer are configured for the bitmap, the head pointer points to a bitmap bit corresponding to a latest received packet in a receive queue, and the tail pointer points to a next to-be-received packet in the receive queue; and the recording, each time one packet is received, a packet sequence number carried in the currently received packet, and determining a packet sequence number of a next to-be-received packet based on the packet sequence number of the currently received packet includes: setting, based on the packet sequence number of the currently received packet, a bitmap bit representing the currently received packet in the bitmap to be valid, and enabling the head pointer to point to the bitmap bit representing the currently received packet; and determining, based on the packet sequence number of the currently received packet, whether the currently received packet is a packet corresponding to a bitmap bit to which the tail pointer currently points, and if yes, updating a pointing direction of the tail pointer, where the tail pointer is redirected to a first bitmap bit in invalid bitmap bits following the bitmap bit corresponding to the currently received packet; or if no, keeping the bitmap bit to which the tail pointer currently points unchanged.

In another possible implementation of the sixth aspect, that the network interface card determines whether the packet sequence number of the next received packet is consistent with the packet sequence number of the next to-be-received packet includes: determining, based on the packet sequence number of the next received packet, whether the tail pointer currently points to a bitmap bit corresponding to the next received packet.

In another possible implementation of the sixth aspect, that the network interface card executes the packet loss detection procedure includes: starting a timer for the packet corresponding to the bitmap bit to which the tail pointer currently points, and if the pointing direction of the tail pointer does not change after the timer expires, determining that the packet corresponding to the bitmap bit to which the tail pointer currently points is lost.

In another possible implementation of the sixth aspect, that the network interface card executes the packet loss detection procedure includes: determining whether a bitmap bit to which the head pointer currently points exceeds a predetermined value, and if yes, determining that a packet corresponding to a bitmap bit between the head pointer and the tail pointer is lost.

In another possible implementation of the sixth aspect, that the network interface card sends the packet retransmission instruction to the source end device includes: sending the packet retransmission instruction to the source end device to request the source end device to resend all packets following the packet corresponding to the bitmap bit to which the tail pointer currently points in the Q packets, where the retransmission instruction carries a packet sequence number of the packet corresponding to the bitmap bit to which the tail pointer currently points.

According to a seventh aspect, a communications apparatus is provided, and the communications apparatus includes a processor and a memory coupled to the processor. The processor is configured to execute the packet transmission method in the first aspect according to a program instruction loaded in the memory.

According to an eighth aspect, a communications apparatus is provided, and the communications apparatus includes a processor and a memory coupled to the processor. The processor is configured to execute the packet transmission method in the second aspect according to a program instruction loaded in the memory.

According to a ninth aspect, a communications system is provided, and the communications system includes a source end device, a destination end device, and at least one routing device. The source end device and the destination end device perform remote direct memory access RDMA through Ethernet, and a communication path between the source end device and the destination end device includes at least one routing device. A network interface card of the source end device includes a source queue pair, and the source queue pair includes a send queue. A network interface card of the destination end device includes a destination queue pair, and the destination queue pair includes a receive queue. The source end device is configured to: obtain Q data segments from the send queue of the source queue pair, separately encapsulate the Q data segments to obtain Q packets, and separately send the Q packets, where each of the Q packets carries a first header and a second header, the first header carried in each packet is used to indicate a write address of the packet in a memory of the destination end device, the second header carried in each packet includes source port number information, source port number information in second headers carried in at least two of the Q packets is different, and Q is a positive integer greater than or equal to 2. The at least one routing device is configured to: receive the Q packets sent by the source end device, determine a forwarding path for each packet based on the source port number information carried in each of the Q packets, and forward each packet based on the determined forwarding path. The destination end device is configured to: receive the Q packets, and separately store the Q packets from the destination queue pair in the memory of the destination end device based on the write address of each of the Q packets in the memory of the destination end device.

The source end device is further configured to execute the method in the first aspect, and the destination end device is further configured to execute the method in the second aspect.

According to a tenth aspect, a computer readable storage medium is provided, including an instruction. When the instruction runs on a computer, the computer is enabled to execute the packet transmission method in the first aspect.

According to an eleventh aspect, a computer readable storage medium is provided, including an instruction. When the instruction runs on a computer, the computer is enabled to execute the packet transmission method in the second aspect.

BRIEF DESCRIPTION OF DRAWINGS

FIG. 8 is a schematic diagram of a frame structure of an encapsulated packet according to an embodiment.

DESCRIPTION OF EMBODIMENTS

To make the objectives, technical solutions, and advantages of this disclosure more understandable, the following provides detailed descriptions. The detailed descriptions provide various embodiments of a device and/or a process by using block diagrams, flowcharts, and/or examples. These block diagrams, flowcharts, and/or examples include one or more functions and/or operations, so a person in the art may understand that each function and/or operation in the block diagrams, the flowcharts, and/or the examples may be performed independently and/or jointly by using much hardware, software, and firmware, and/or any combination thereof.

An RDMA technology is an abbreviation for remote direct memory access, and is generated to resolve a data processing delay at a server end in network transmission. RDMA is used to directly transmit data on one server to a storage area of another server through a network, and quickly move the data from one system to a memory of another system without affecting an operating system of the system. In this way, a calculation processing function of the system is less used. As such, overheads of external memory replication and context switching are eliminated, to free up memory bandwidth and a CPU cycle to improve application system performance. Performing RDMA through Ethernet is referred to as RoCE.

Figure 1:
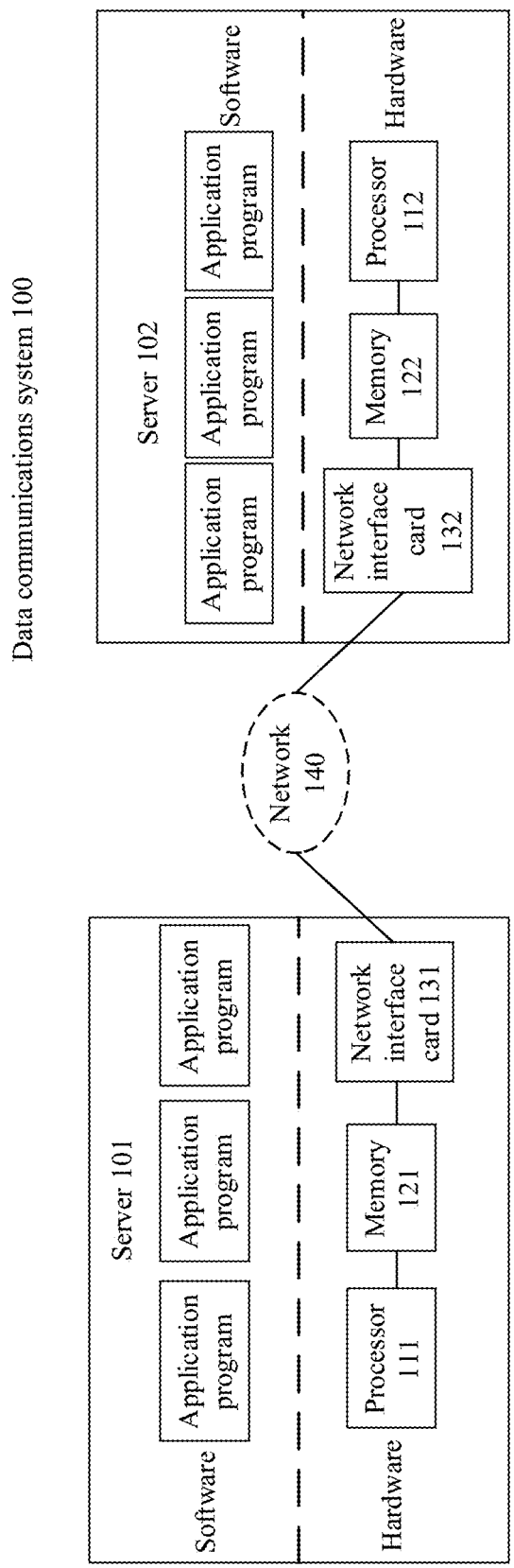
FIG. 1 is a schematic composition diagram of a data communications system according to an embodiment.

As shown in FIG. 1, in a data communications system 100, servers may be roughly divided into a software layer and a hardware layer (two servers are shown as an example in FIG. 1). The software layer includes at least one application program, and the hardware layer mainly includes a processor 111, a memory 121, a network interface card 131, and the like. In this embodiment, data of an application program on a server 101 needs to be shared to another server 102 through the RoCE protocol for use by an application program on the another server 102.

Figure 2:
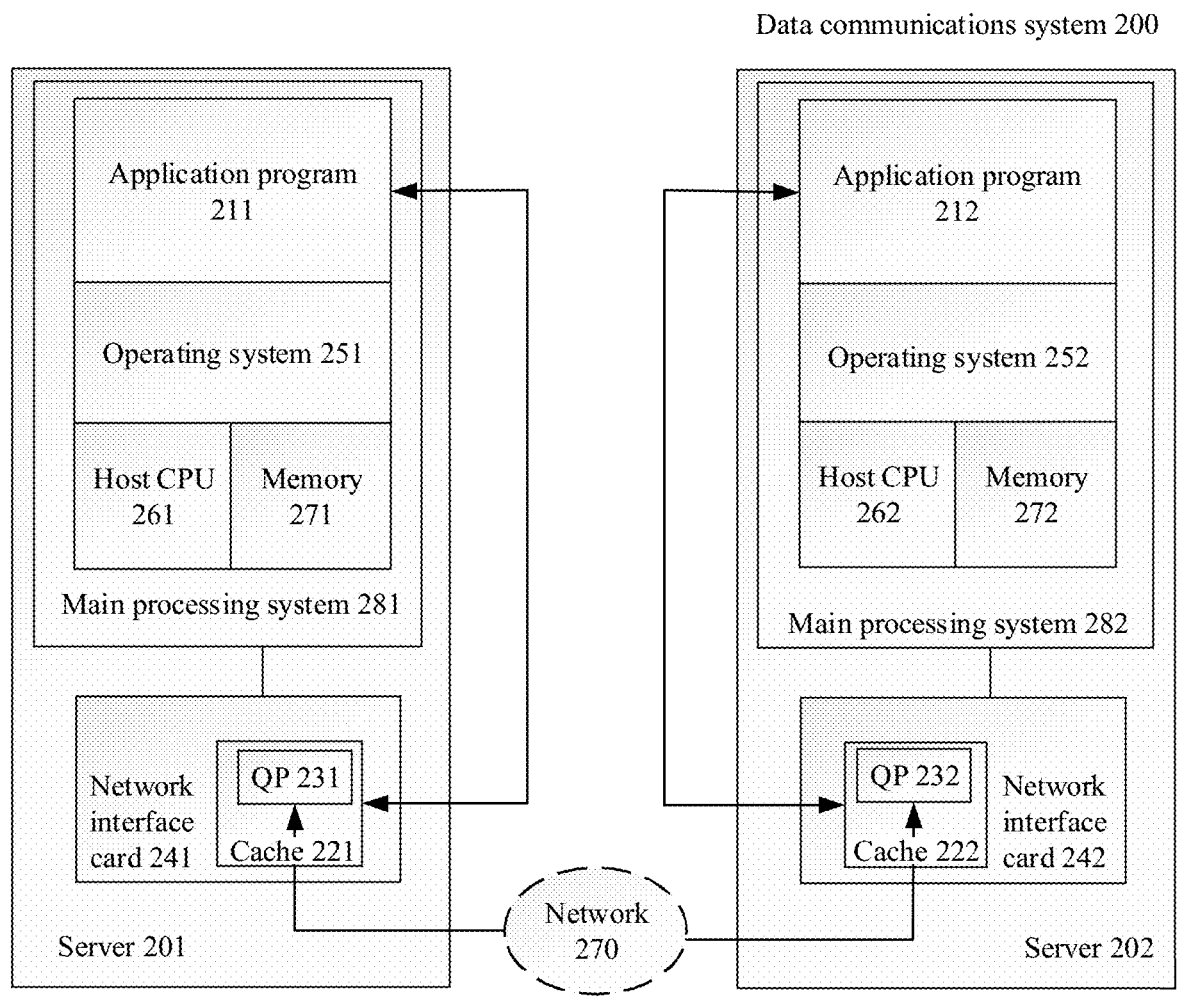
FIG. 2 is a schematic diagram of a data communications system using the RoCE protocol for transmission.

As shown in FIG. 2, a data communications system 200 includes a server 201 and a server 202. The server 201 includes a network interface card 241 and a main processing system 281. The main processing system 281 includes a host CPU 261 and a host memory 271 (conventional hardware of another computer system such as a hard disk and a bus are not shown in FIG. 2), and the main processing system 281 further runs various software components such as an operating system 251 and an application program 211 running in the operating system 251. The server 202 includes a network interface card 242 and a main processing system 282. The main processing system 282 includes a host CPU 262 and a host memory 272, and the main processing system 282 further runs various software components such as an operating system 252 and an application program 212 running in the operating system 252.

The network interface card 241 (which may also be referred to as a network adapter or a communication adapter) has a cache 221, and a queue pair (QP) may be configured in the cache 221, namely, a QP 231 shown in FIG. 2 (the QP on the network interface card is configured based on a requirement of an upper-layer application, a plurality of QPs may be configured, and one QP is used as an example in FIG. 2). The QP is a virtual interface provided by the network interface card for an application program, and includes a send work queue and a receive work queue. The send work queue and the receive work queue are always generated together and appear in pairs, and remain in pairs as long as the two exist. An instruction sent by the application program to the network interface card is referred to as a work queue element (WQE). Before the application program 211 on the server 201 sends data to the application program 212 on the server 202 through RDMA, the server 201 and the server 202 first establish a QP pair. That is, it is clear that the QP 231 and a QP 232 jointly transmit data between the application program 211 and the application program 212, and a corresponding queue pair identifier (ID) is added to a subsequently sent packet.

A working process of RDMA usually includes three parts. First, when executing an RDMA request, the application program 211 on the server 201 does not replicate any data in a memory of the main processing system, and the RDMA request is sent from a cache of the application program 211 to the send queue of the queue pair in the cache 221 on the network interface card 241. Second, the network interface card 241 reads content (data) of the send queue in the cache 221, and sends the content to the QP 232 on the server 202 in a form of a packet, to write the content into a cache 222 on the network interface card 242. Thirdly, after receiving the data, the network interface card 242 directly writes the data into a memory corresponding to the application program 212 of the main processing system.

Figure 3:
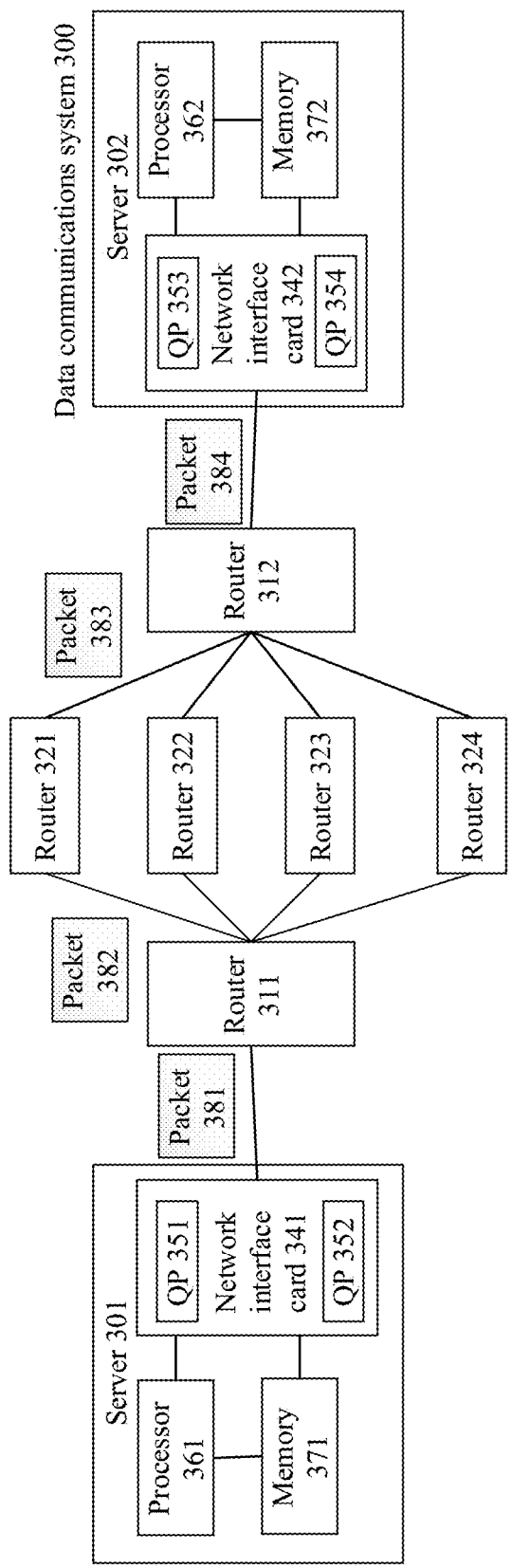
FIG. 3 is a schematic diagram of load imbalance caused by packet transmission between two servers in the RoCE protocol in other approaches.

In a process in which a packet arrives at the server 202 from the server 201 through multi-path Ethernet, a routing device in Ethernet selects a forwarding path based on 5-tuple information of the packet. Specifically, the routing device performs hash calculation on the 5-tuple information of the packet, that is, a source port number, a destination port number, a source IP address, a destination IP address, and a protocol type of the packet, and a hash value obtained through the calculation is used as a basis of the forwarding path of the packet. As shown in FIG. 3, two servers: a server 301 and a server 302 in a data communications system 300 are connected through a plurality of routers, and perform communication in the RoCE protocol. There is a plurality of QPs on each server. For example, as shown in the figure, there is a QP 351 and a QP 352 on the server 301, and there is a QP 353 and a QP 354 on the server 302. In other approaches, a same QP uses a same source port number when sending data. When the QP 351 on the server 301 sends data to a QP on the server 302, 5-tuple information of a packet keeps unchanged. Therefore, hash values used as a basis for path selection are also the same. As a result, a same path is selected for all data sent by the QP 351, for example, all the data are sent to the QP on the server 302 through a router 321. When an amount of data sent by the QP 351 is relatively large, load on a network path connected to the router 321 is relatively heavy. Consequently, load on paths of an entire packet transmission system is unbalanced. In addition, due to a fast-start characteristic of a RoCE network, a source server sends a maximum amount of data when data sending starts in the RoCE network. When network traffic reaches a specified value, a probability of network congestion significantly increases. In addition, there are usually more than two servers in the data communications system 300, and more servers may be connected to the router 321. When congestion occurs on the network path connected to the router 321, packet transmission of all servers connected to the router 321 is affected. When network congestion occurs, a network delay increases, and a possibility of a packet loss in the network also increases. The RoCE network is relatively sensitive to a packet loss. As a packet loss rate in the network increases, effective bandwidth for network transmission decreases rapidly.

To implement more balanced transmission of packets in the RoCE protocol in a multipath network, this disclosure provides a packet transmission method with a finer granularity and a related apparatus. When a source end sends a plurality of packets, packets sent by a same QP are further grouped, so that packets in different groups in the same QP carry different source port number information, and the packets sent by the same QP obtain different paths by using a hash algorithm when passing through the multi-path network. Therefore, even if traffic of a packet sent by the QP abnormally increases in a period of time, the traffic can be prevented from passing through a same path, and transmission imbalance and congestion of the entire multipath network caused by congestion of a path are avoided. When the source end sends the packets, source port number information of the packets sent by the same QP is modified. Therefore, packets carrying different source port number information may arrive at a destination end by passing through different paths in the multipath network. Because lengths and efficiency of the paths are different, an order in which the packets arrive at the destination end may be different from an order of sending the packets by the source end. In this case, the destination end may fail to store the packets in a real destination after receiving the packets. In other approaches, packets sent by a same QP carry same source port number information, the packets are forwarded on a same path, and an order of receiving by the destination end is consistent with an order of sending by the source end. Therefore, the RoCEv2 protocol stipulates that only a first packet in the packets sent by the same QP at the source end carries a write address of data in the packet in a memory of the destination end, and another non-first packet does not need to carry a related write address, so that the destination end can write the packets into corresponding addresses in the memory based on an order of receiving the packets. After the packets sent by the same QP at the source end are sent by using different source port number information, the packets sent by the same QP are further extended so that headers of the packets are different from those in other approaches, to avoid a problem that out-of-order packets cannot be written into the real destination at the destination end.

Figure 4:
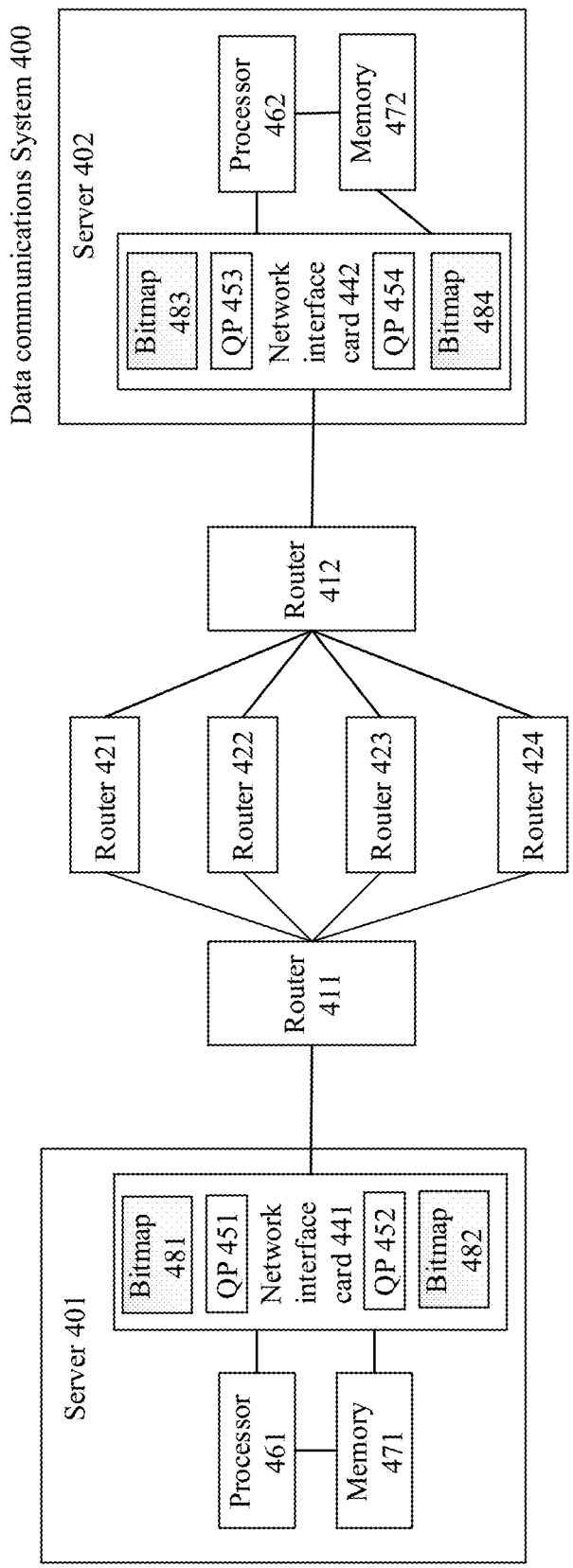
FIG. 4 is a schematic composition diagram of a system for data communication between two servers in the RoCE protocol according to an embodiment.

FIG. 4 is a schematic diagram of a system according to an embodiment. As shown in the figure, a data communications system 400 includes two servers: a server 401 and a server 402 (two servers are shown in the figure, and there may be two or more servers in practice). The server 401 and the server 402 are directly connected to a router 411 and a router 412 respectively, and the router 411 and the router 412 are connected to each other through four routers: a router 421, a router 422, a router 423, and a router 424. The server 401 includes a processor 431 and a network interface card 441. The network interface card 441 includes several QPs, namely, a QP 451 and a QP 452 shown in the figure. One corresponding bitmap is configured for each QP. Similar to the server 401, the server 402 includes a processor 432 and a network interface card 442. The network interface card 441 and the network interface card 442 support the RoCEv2 protocol, and RDMA communication is performed between the server 401 and the server 402 through a QP. A bitmap in FIG. 4 is specific implementation of receiving and sequencing packets at a destination end in one embodiment, and another method may be used for implementation in another embodiment.

Figure 5:
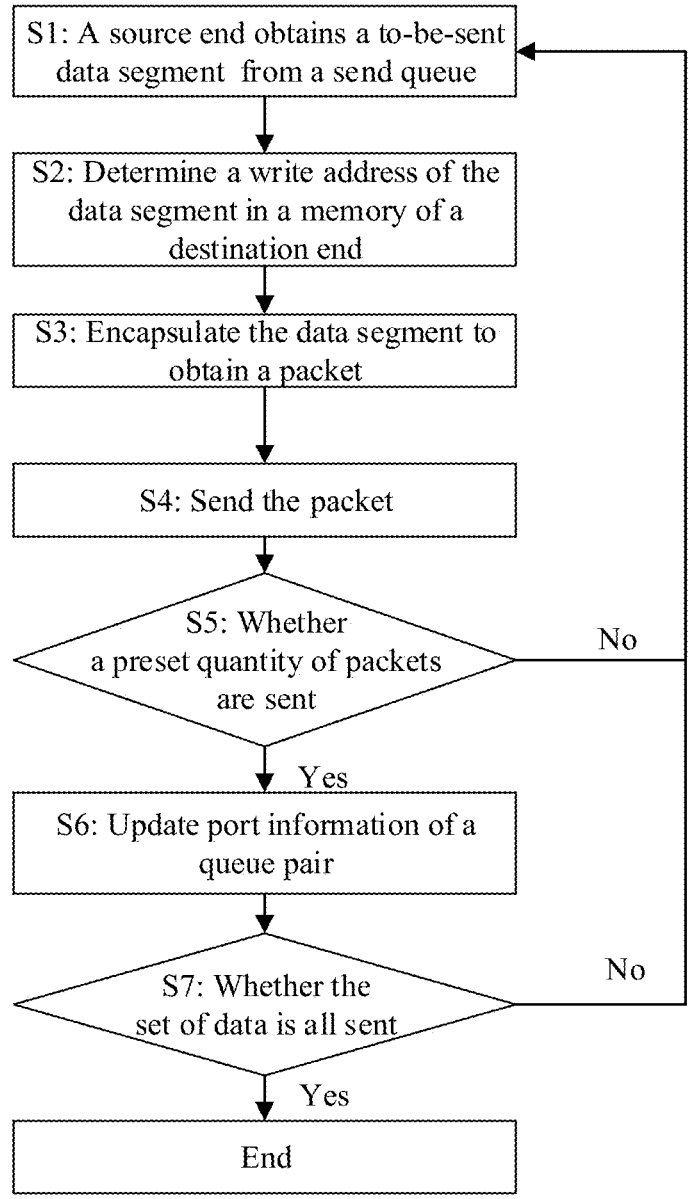
FIG. 5 is a schematic flowchart of a source end according to an embodiment.
Figure 6:
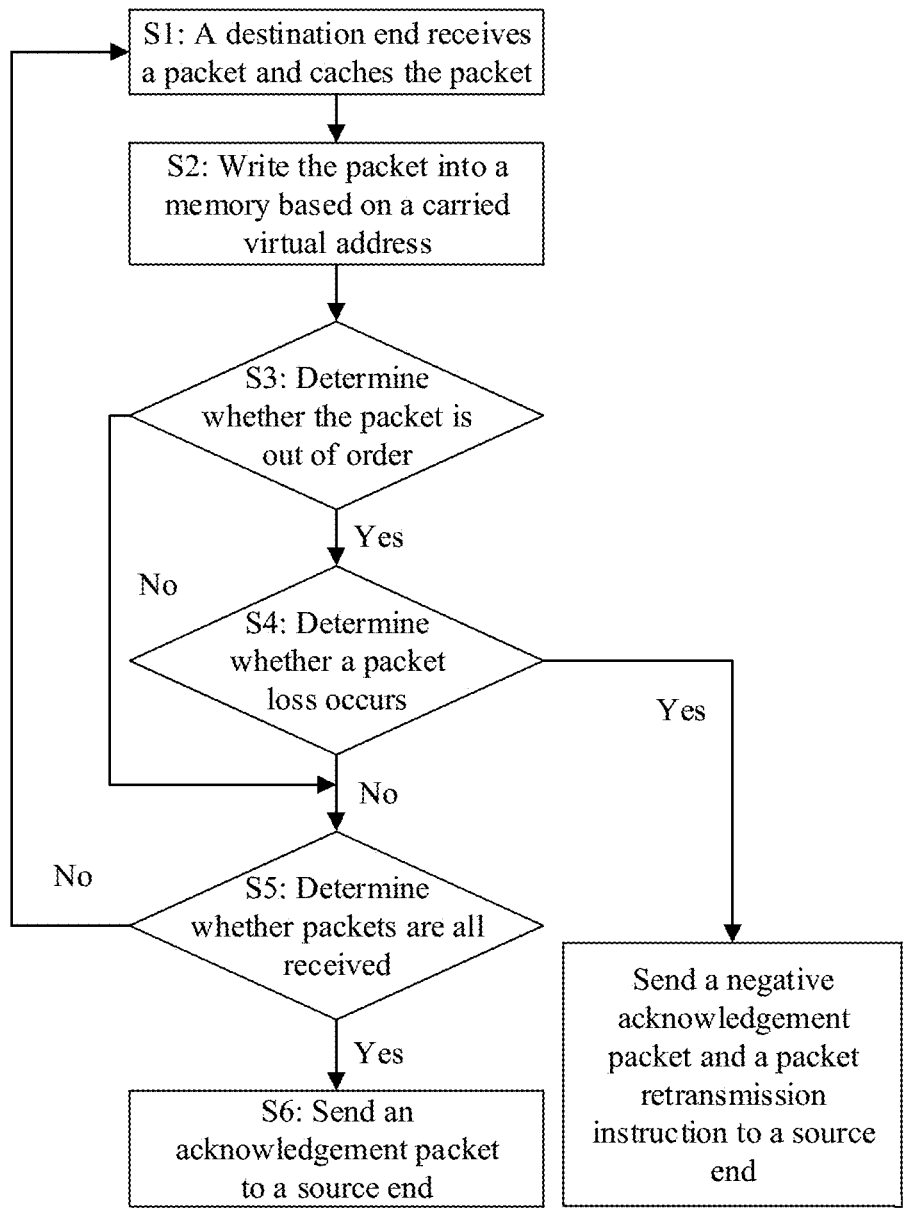
FIG. 6 is a schematic flowchart of a destination end according to an embodiment.

FIG. 5 and FIG. 6 are flowcharts of sending a packet by a source server and receiving a packet by a destination server according to an embodiment.

As shown in FIG. 5, steps performed by the source server are as follows:

S1: A network interface card 441 obtains Q to-be-sent data segments from a send queue of a QP 451. In general, after an application program in a source server 401 submits a work request, the work request is directly sent to a corresponding QP on the network interface card 441. The network interface card 441 may further read the work request, and enable the QP to execute the work request. In this embodiment, content of the work request is to send a set of application data. The set of application data may include the Q data segments, where Q is a positive integer greater than or equal to 2.

S2: Determine an address that is of a memory of a destination server 402 and into which a packet encapsulated by the obtained data segment is to be written. The address is obtained through calculation based on base addresses of the Q data segments and a length of a data segment preceding the obtained data segment in the Q data segments.

Before the source server 401 sends data to the destination server 402 through RDMA, the source server 401 first communicates with the destination server 402, and the destination server 402 notifies the source server 401 of a base address of a packet encapsulated by data to be sent by the source server 401. The base address is a write address of the first packet in the group of packets in the memory of the destination server.

S3: Encapsulate the obtained data segment to obtain the encapsulated packet.

Figure 7:
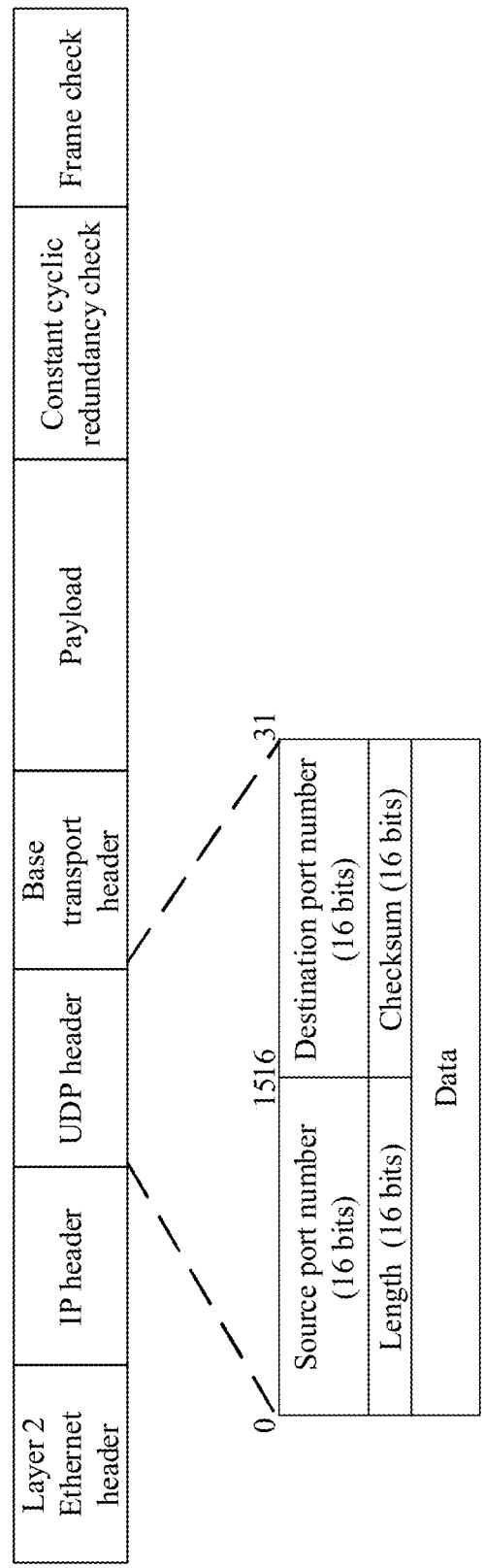
FIG. 7 is a schematic diagram of a frame structure of a packet in the RoCEv2 protocol in other approaches.

FIG. 7 shows an existing RoCEv2 packet format. In comparison with an RoCEv1 format, a header part of the User Datagram Protocol (UDP) is added to the RoCEv2 packet format, so that an Ethernet IP routing function is supported and scalability of a RoCE network is enhanced. The header of UDP includes five parts: a source port number, a destination port number, a length, a checksum, and data. In a RoCEv2 packet, a value of a destination port number of UDP is stipulated according to the protocol and is 4791 as a constant. Because there is a plurality of servers in a data communications system, and there is a plurality of QPs on each server, values of source port numbers of each QP are usually different.

In this embodiment, expansion of an encapsulated packet mainly includes two parts. Details are as follows:

As shown in FIG. 8, first, a first header is added to a data segment. The first header carries information indicating a write address of the packet in a memory of a destination end. Specifically, if the data segment is a first data segment in the set of data, an RDMA extended transport header (RETH) part is added after a base transport header (BTH) part of the data segment. If the data segment is not the first data segment, an extended header (EXH) part is added after the BTH part of the data segment. BTH parts of a first data segment and a last data segment in each WQE separately include corresponding information to indicate that the packet is the first data segment or the last data segment in the WQE.

The RETH part includes three parts: a virtual address, a remote key, and a DMA length. The virtual address part has a length of 64 bits and is used to record a corresponding virtual address of the destination end after an RDMA operation. The remote key part has a length of 32 bits and is used to record authorization information for allowing the RDMA operation. The DMA length part has a length of 32 bits and is used to record a quantity of bytes of a packet on which the DMA operation is performed. The EXH includes four parts: a virtual address, an immediate part, a WQE number, and a reserved field. The virtual address part has the same length of 64 bits as the virtual address part in the RETH header and is used to record an address that is of the memory of the destination end and into which a current packet needs to be written. The immediate part has a length of 1 bit and is used to record whether the current packet carries the immediate part. The WQE number part has a length of 31 bits and is used to record a WQE number sent by a QP. The reserved part has a length of 32 bits and is a reserved field. The EXH header needs to include the virtual address, and three remaining parts may be adjusted based on an actual requirement.

The header including the virtual address is encapsulated into the packet, so that the packet can be quickly written into the memory when arriving at the destination end. In addition, because the packet has the virtual address part, even if the packet is out of order during network transmission, the packet can be written into a corresponding location in the memory of the destination end based on the virtual address.

Second, a second header is added to the data segment. The second header carries source port number information of a source queue pair. In comparison with other approaches, at least two of Q packets encapsulated by the Q data segments in this embodiment have different source port number information. When a router selects a forwarding path based on 5-tuple information, because source port information varies, it is very likely that different forwarding paths are selected for packets having different source port number information. Because different source port number information is set for packets sent by a same QP, traffic of the packets sent by the same QP can be shared to different forwarding paths. Even if the traffic of the packets sent by the QP is relatively large, congestion of a path in an entire multipath network is not caused.

Optionally, a packet sequence number (PSN) may be further added to the BTH part of the data segment. The packet sequence number is used to indicate an order of the data segment in the Q data segments.

S4: Each time one data segment is encapsulated into a packet, send the packet.

S5: Determine whether a preset quantity of packets is sent. When the preset quantity of packets is sent, S6 is performed; or when the preset quantity of packets is not sent, S1 is performed.

Optionally, when it is determined whether the preset quantity of packets is sent and the port information of the source queue pair is updated, the preset quantity may be variable. For example, the port information of the source queue pair may be updated after three packets are first sent, and then the port information of the source queue pair is updated after four packets are sent. Alternatively, the preset quantity may be constant. For example, each time three packets are sent, the port information of the source queue pair is updated.

S6: After the preset quantity of packets is sent, update the port information of the source queue pair. In this method, second headers of packets encapsulated by the set of data have different source port numbers. Therefore, when a packet is transmitted in the network, the router selects a path based on a hash value of 5-tuple information of the packet. Because packets have different source port numbers, it is very likely that different hash values are obtained, and different paths are selected for transmission, so that traffic on each path in the network is more balanced.

The current RoCE protocol stipulates that each QP only uses a constant source port number, and forwarding paths of packets sent by the QP in the network are constant. The packets are not out of order as long as no packet loss occurs. In the foregoing embodiment, to implement traffic balancing, source port number information corresponding to the QP changes, and therefore a forwarding path of a packet in the network also changes. Because packets on different network paths may be processed at different time, the packets may be out of order at the destination end. A source end encapsulates an RETH or EXH extended header into a packet, and places, into the packet, a virtual address that is of the memory of the destination server and into which the packet is to be written. When the packet arrives at the destination end, the packet may be directly written into a corresponding location in the memory of the destination server based on the virtual address in the RETH or EXH extended header, so that an order of sending the packet by the source end is restored.

S7: Determine whether the Q data segments are all sent. If there is still an unsent data segment, S1 is performed.

It should be noted that, numbers of S1 to S7 are merely used for reference and do not imply that in this embodiment, the foregoing steps need to be performed in a specific order. For example, the step S2 of determining the write address may be performed before S1.

In another embodiment, the source end may classify the to-be-sent Q data segments into at least two groups, and each group includes at least one data segment. Data segments in each group are encapsulated to obtain packets in each group, where the packets in each group carry same source port number information, and packets in at least two groups carry different source port number information. After the source end sends the Q packets, the Q packets are forwarded through the router. The router selects a forwarding path based on 5-tuple information of the Q packets. When source port number information of the Q packets is different, different paths may be selected to forward the Q packets. Therefore, an order in which the Q packets arrive at the destination end may be different from an order in which the source end sends the Q packets. After receiving the Q packets, the destination end needs to store the data segments in the Q packets in corresponding addresses. In addition, in other approaches, the RoCE protocol specifies that the destination end receives the packets in the sending order of the packets. If the received packets are out of order, the destination end immediately sends a retransmission instruction, so that the source end resends a packet that may be lost on a transmission path. However, in the foregoing embodiment, because the source port number information of the packets sent by the same QP changes at a send end, the order in which the Q packets arrive at the destination end is likely to be different from the order in which the Q packets are sent. In this case, if the destination end determines that the received packets are out of order, the destination end immediately sends the retransmission instruction, and costs of packet retransmission are relatively high. The destination end further performs out-of-order detection on the received packets, and does not send the packet retransmission instruction to the source end immediately when detecting an out-of-order situation. Instead, the destination end starts a packet loss detection procedure, and sends the packet retransmission instruction to the source end only when determining, based on the packet loss detection procedure, that a packet loss occurs, thereby improving transmission efficiency of the system. FIG. 6 shows an embodiment of a specific procedure of the destination end.

In FIG. 6, in this embodiment, a packet sequence number carried in a received packet is used to check whether a packet sent by the source server is out of order or lost, and to determine whether packets are all received. The method may be implemented through a bitmap, an array, a linked list, or the like. This embodiment is described by using a bitmap as an example.

FIG. 9 to FIG. 12 show a principle of a bitmap algorithm in this embodiment.

Figure 9:
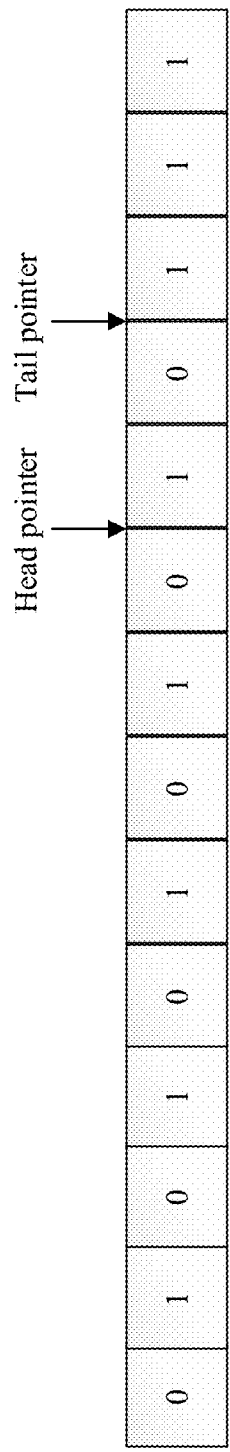
FIG. 9 is a schematic diagram of a bitmap structure according to an embodiment.

FIG. 9 shows a schematic diagram of a bitmap for implementing the bitmap algorithm. As shown in FIG. 9, in this embodiment, each QP corresponds to one bitmap for recording a receiving status of a packet. Each bitmap includes a plurality of bitmap bits, and each bitmap bit represents one packet. The bitmap bits of the bitmap are numbered from front to back, and a correspondence is established between a bitmap bit and a value of a packet sequence number of a packet. The bitmap bits correspond to packets in a front-to-back sending order of the packets. Each bitmap further has a tail pointer and a head pointer. The tail pointer points to a bitmap bit corresponding to a next to-be-received packet in a receive queue of a queue pair corresponding to the bitmap, and the head pointer points to a bitmap bit corresponding to a currently latest received packet. When a value of a bitmap bit in the bitmap is valid, it indicates that a packet corresponding to the bitmap bit is received. When a value of a bitmap bit in the bitmap is invalid, it indicates that a packet corresponding to the bitmap bit is not received. A valid state may be represented by a value of 1 or a value of 0. In this embodiment, the valid state is represented by the value of 1. In addition, a range of the used bitmap is set based on a range of values of packet sequence numbers of to-be-sequenced packets. If a source end sends Q packets, a bitmap corresponding to a destination end includes at least Q bitmap bits. In the range of the bitmap, a forefront bitmap bit corresponds to a packet having a value of a smallest packet sequence number.

The tail pointer points to the next to-be-received packet, and the next to-be-received packet is generally a packet that is not received currently and is to be received next in subsequently to-be-received packets in the receive queue of the queue pair corresponding to the bitmap. In addition, the next to-be-received packet is a latest sent packet in packets that are not received currently. In other words, the next to-be-received packet is generally a packet with a smallest packet sequence number in packets that are not received by the destination end currently. For example, the source end sends the Q packets, and the Q packets are sent in an order of 1 to Q. A packet sequence number 1 indicates a first sent packet, and a packet sequence number Q indicates a last sent packet. If the destination end receives packets with packet sequence numbers 1, 2, and 5, a next to-be-received packet is a packet with a packet sequence number 3, and the tail pointer also points to a bitmap bit corresponding to the packet with the packet sequence number 3.

Figure 10:
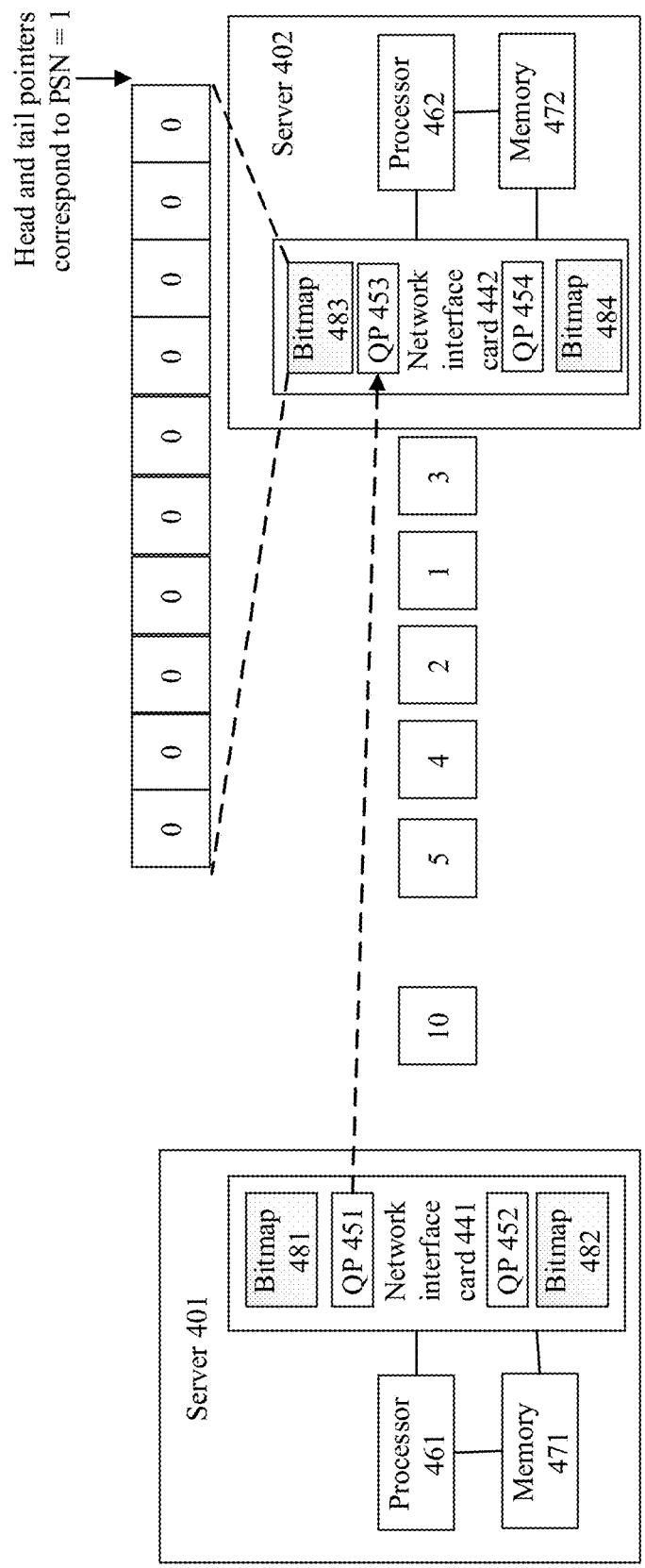
FIG. 10 is a schematic diagram of application of a bitmap in a data communications system according to an embodiment.
Figure 11:
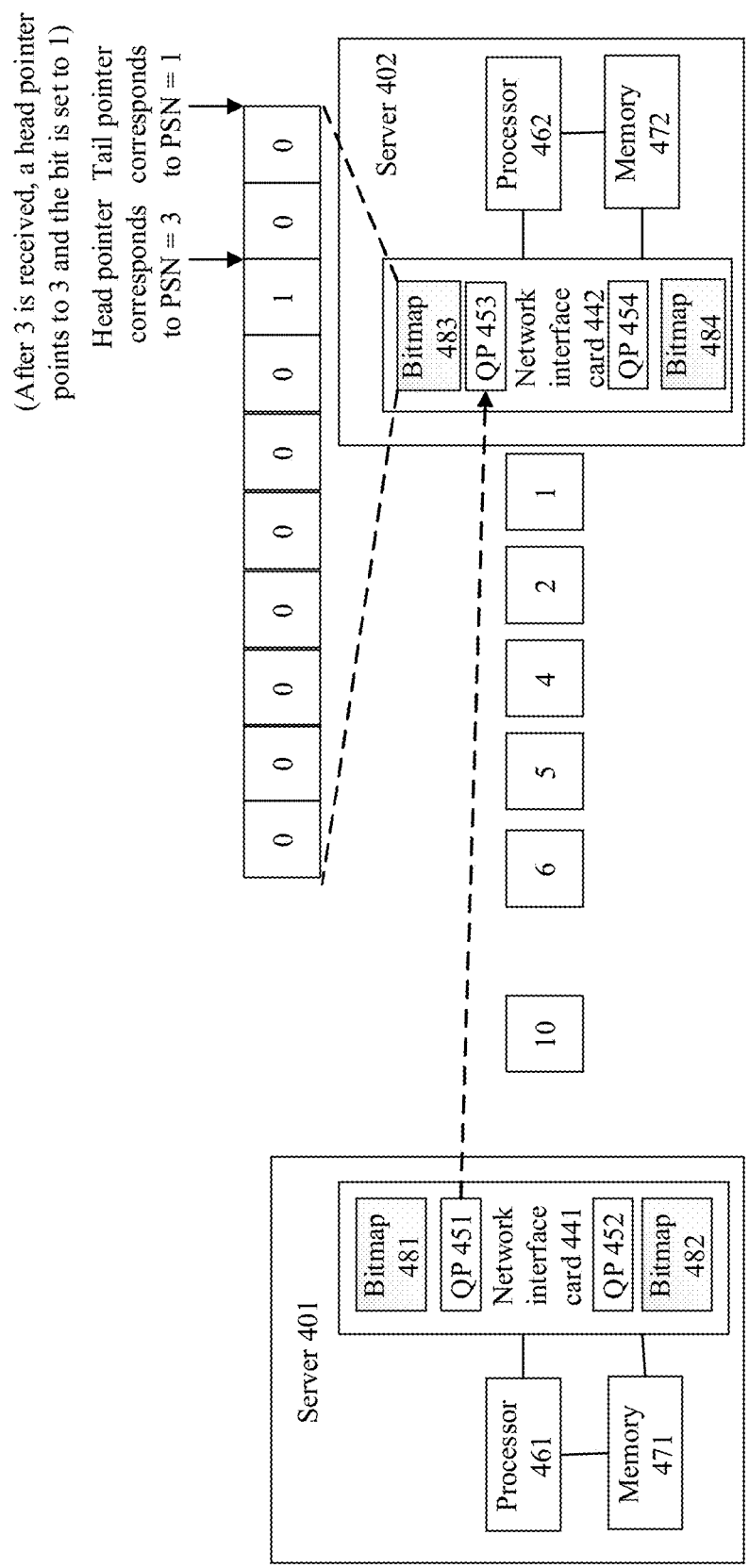
FIG. 11 is a schematic diagram of a bitmap when a destination end receives an out-of-order packet according to an embodiment.
Figure 12:
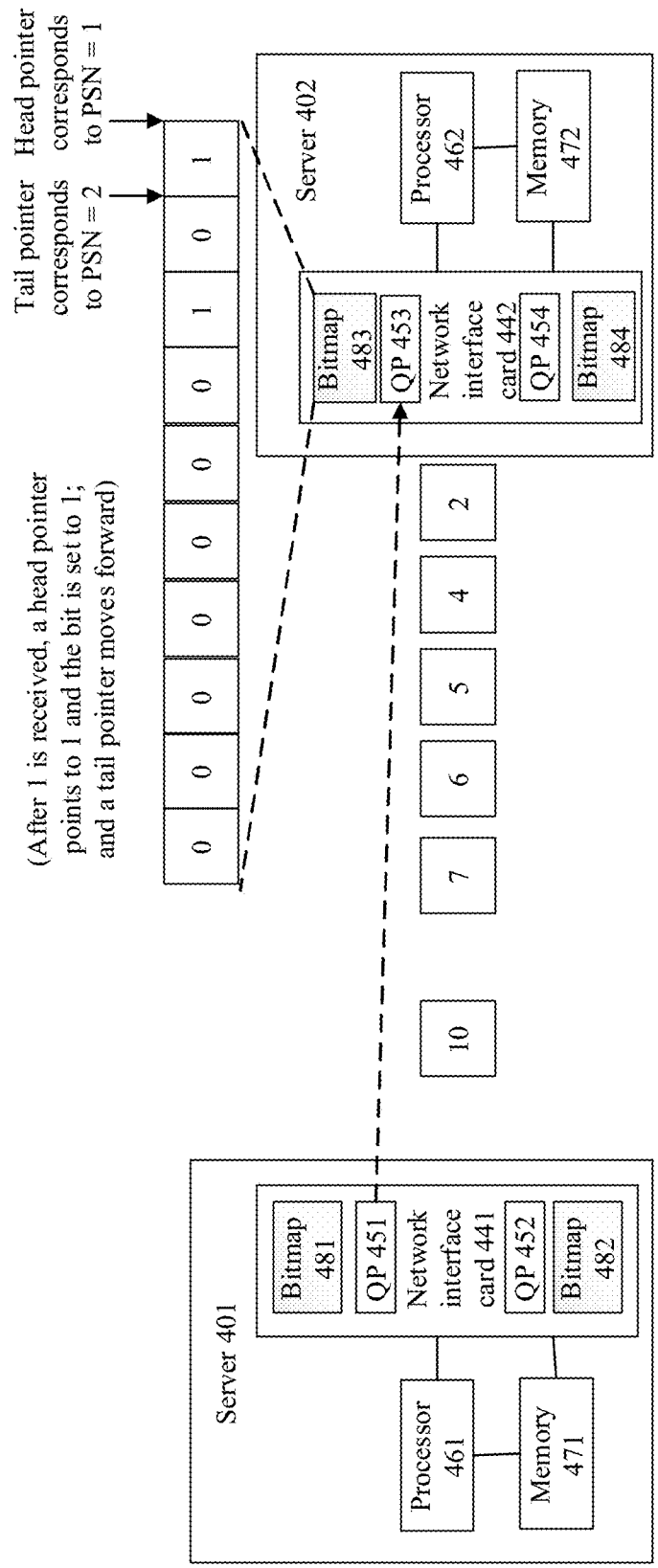
FIG. 12 is a schematic diagram of a bitmap when a destination end receives a next packet that is to be received currently according to an embodiment.

FIG. 10 to FIG. 12 show how a value of a bitmap bit and locations of a head pointer and a tail pointer in a bitmap change based on a received packet. For example, as shown in FIG. 10, a QP 451 on a server 401 sends 10 packets to a QP 453 on a server 402. Packet sequence numbers of the packets are 1 to 10, and a corresponding bitmap also has 10 bitmap bits. The 10 bitmap bits are numbered 1 to 10 from front to back (from right to left in the figure), to correspond to the packets one by one. An order of the packets changes in a transmission process, and an order of the packets arriving at the destination end QP 453 is 3, 1, 2, 4, 5, 6, 7, 8, 9, and 10.

As shown in FIG. 11, when the destination end QP 453 receives a packet with a packet sequence number 3, the head pointer moves to a corresponding bitmap bit 3 and a value of the bitmap bit is set to be valid. Because the tail pointer points to a bitmap bit corresponding to a next to-be-received packet, that is, a packet with a packet sequence number 1, the tail pointer keeps unchanged.

As shown in FIG. 12, when the destination end QP 453 receives the packet with the packet sequence number 1, the head pointer moves to a corresponding bitmap bit 1 and a value of the bitmap bit is set to be valid. The tail pointer receives the next packet that is to be received currently, and therefore moves. The tail pointer is redirected to a first bitmap bit in invalid bitmap bits following the bitmap bit corresponding to the currently received packet, namely, a bitmap bit 2.

As shown in FIG. 6, in an embodiment, steps performed by a destination end are as follows:

S1: The destination end successively receives packets sent by a source end, and caches the packets in a corresponding target queue pair.

S2: Because an RETH part or an EXH part is added to a header when a received packet is at the source end, both the RETH part and the EXH part include an address that is of a memory of the destination end and into which the packet is to be written. The destination end writes the received packet into the corresponding address of the memory based on a virtual address included in the packet.

S3: Record, each time one of Q packets is received, a packet sequence number carried in the currently received packet, and determine a packet sequence number of a next to-be-received packet based on the packet sequence number of the currently received packet; and after a next packet in the Q packets is received, determine whether a packet sequence number of the next received packet is consistent with the packet sequence number of the next to-be-received packet.

Taking a manner of using a bitmap for checking as an example, after a packet sent by the source end is received, a value of a bitmap bit corresponding to the packet in the bitmap is set to be valid based on a packet sequence number of the packet, namely, 1. A head pointer of the bitmap points to the bitmap bit corresponding to the packet, and a tail pointer of the bitmap points to a bitmap bit corresponding to a next packet that is to be received currently. Therefore, when the head pointer and the tail pointer in the bitmap point to different bitmap bits, it may be determined that the received packet is not the next packet that is to be received currently, that is, the received packet is out of order. When the received packet is the next packet that is to be received currently, S5 is directly performed to determine whether the packets are all received. When the received packet is not the next packet that is to be received currently, S4 is performed.

S4: When the packet sequence number of the next received packet is not consistent with the packet sequence number of the next to-be-received packet, start a packet loss detection procedure to determine whether a packet loss occurs in a packet transmission process. Still taking the manner of using a bitmap for checking as an example, when it is determined that the received packet is not the next packet that is to be received currently, a timer is started. If a pointing direction of the tail pointer does not change after the timer expires, it indicates that the destination end fails to receive, within a preset time, the packet corresponding to the bitmap bit to which the tail pointer points. Therefore, the packet corresponding to the bitmap bit to which the tail pointer currently points is lost. If the packet corresponding to the bitmap bit to which the tail pointer currently points is received, the tail pointer moves and the timer is to be reset.

There is another method for determining whether a packet loss occurs in the transmission process. When it is determined that the received packet is not the next packet that is to be received currently, it is determined whether a bitmap bit to which the head pointer currently points exceeds a predetermined value T. If the bitmap bit to which the head pointer currently points exceeds the predetermined value T, it indicates that a packet corresponding to a bitmap bit between the bitmap bit to which the head pointer currently points and the bitmap bit to which the tail pointer points is lost. The predetermined value T may be set based on an actual requirement. For example, the predetermined value T may be set to Q, that is, a quantity of packets in the group. In this case, when the bitmap bit to which the head pointer points exceeds the predetermined value T, it indicates that the destination end receives a next group of packets before the group of packets are all received, and it may be determined that a packet loss occurs.

If it is determined, through the packet loss detection procedure, that a packet loss occurs in the packet transmission process, the destination end sends a negative acknowledgement packet to the source end to inform the source end that there is an error in the packet transmission process. In addition, the destination end sends a packet retransmission instruction to the source end to request the source end to retransmit all packets following the packet corresponding to the packet sequence number, where the retransmission instruction carries the packet sequence number of the packet corresponding to the bitmap bit to which the tail pointer currently points. In this way, when the destination end receives an out-of-order packet, it can be more accurately determined that a packet loss may occur in which situations, and the source end is instructed to perform packet retransmission only when it is determined that a packet loss occurs, thereby improving system efficiency.

When it is determined that no packet loss occurs, S5 is performed.

S5: Determine whether the packets are all received. When values of bitmap bits corresponding to the group of packets are all set to be valid, it indicates that the packets of the group are all received, and S6 is performed. If the packets are not all received, S1 is performed again.

S6: When the packets are all received, the destination end sends an acknowledgement packet to the source end.

Figure 13:
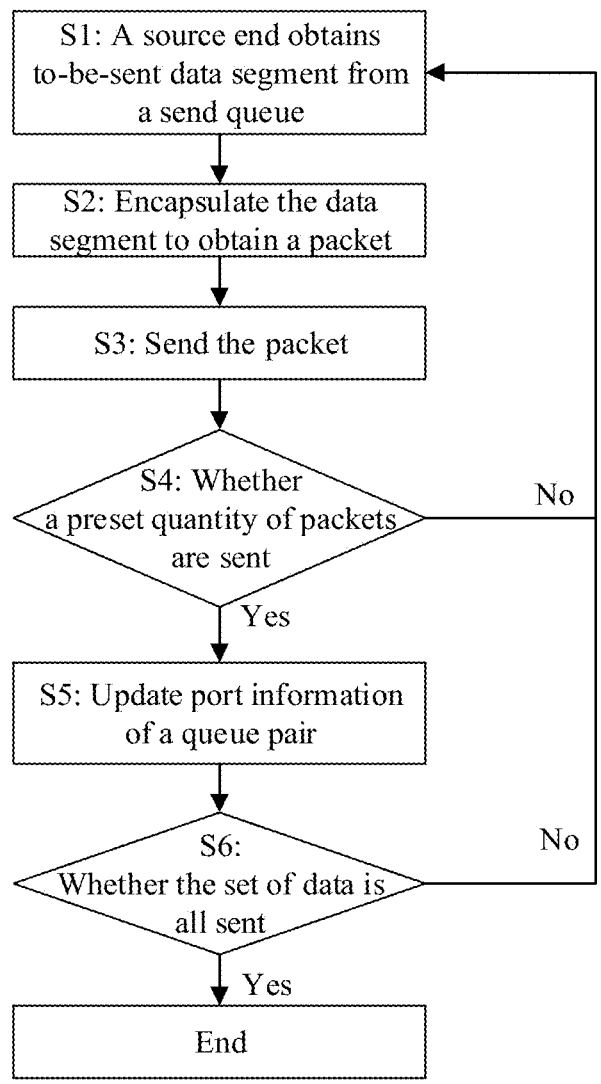
FIG. 13 is a schematic flowchart of a source end according to another embodiment.
Figure 14:
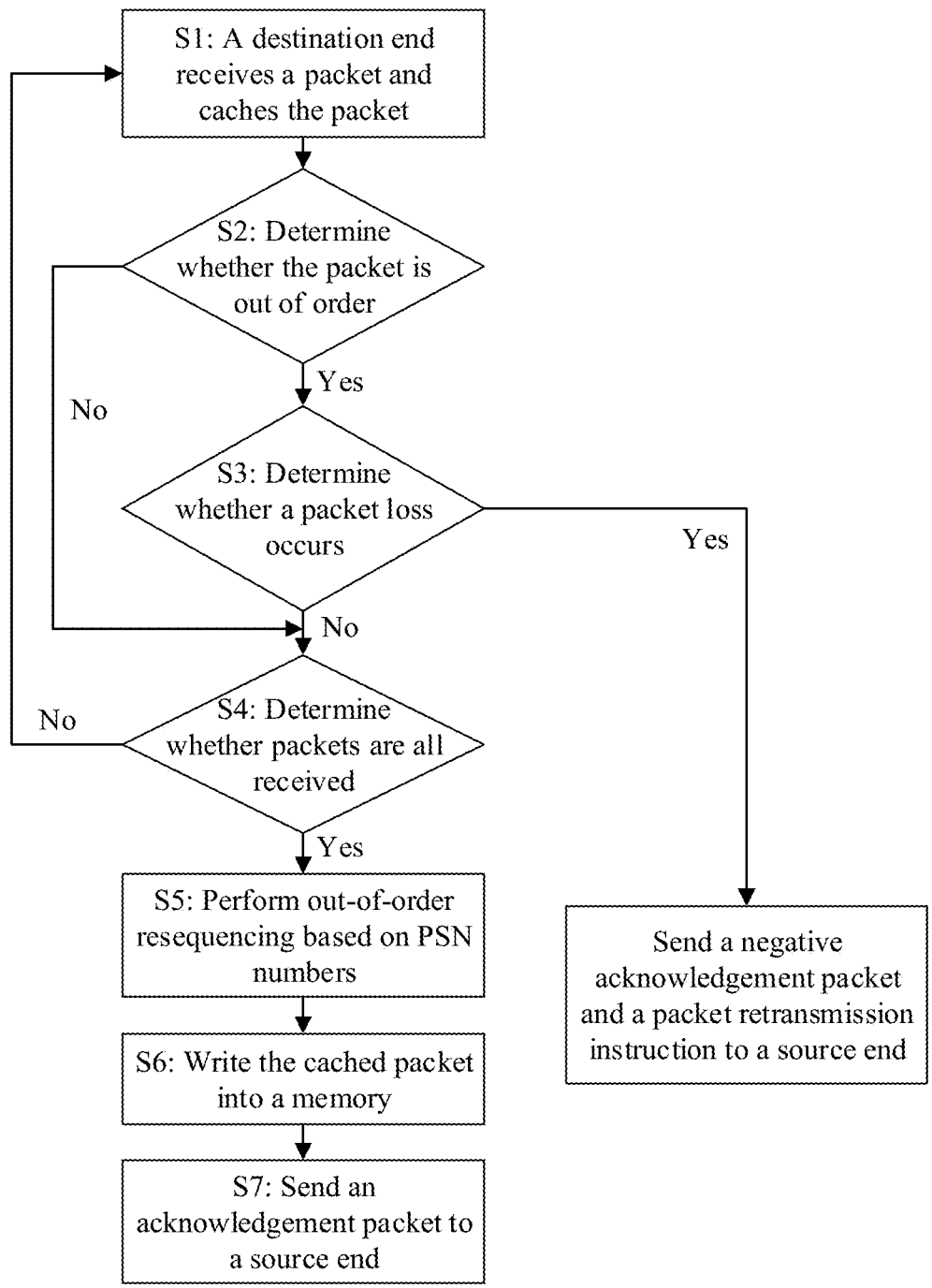
FIG. 14 is a schematic flowchart of a destination end according to another embodiment.

FIG. 13 and FIG. 14 are flowcharts of a source end and a destination end according to another embodiment.

As shown in FIG. 13, steps performed by the source end are as follows:

S1: A network interface card 441 obtains Q to-be-sent data segments from a send queue of a QP 451.

S2: Encapsulate the obtained data segments to obtain encapsulated packets. Different from the foregoing embodiment, in this embodiment, only a second header carrying port information of the source queue pair is added to a data segment, and an RETH header carrying a write address in a memory of the destination end is added to a first data segment in each set of data, without adding, to a remaining data segment, an EXH header carrying the write address in the memory of the destination end.

S3: Each time one data segment is encapsulated into a packet, send the packet.

S4: Determine whether a preset quantity of packets is sent. When the preset quantity of packets is sent, S5 is performed; or when the preset quantity of packets is not sent, S1 is performed.

S5: After the preset quantity of packets is sent, update the port information of the source queue pair.

S6: Determine whether the set of data is all sent. If there is still data that is not encapsulated and is not sent, S1 is performed.

As shown in FIG. 14, in a second embodiment, steps performed by the destination end are as follows:

S1: The destination end successively receives packets sent by a source end, and caches the packets in a corresponding queue pair.

S2: Determine whether a received packet is a next packet that is to be received currently. If no, S3 is performed; or if yes, S4 is performed.

S3: Determine whether a packet is lost. If a packet is lost, the destination end sends a negative acknowledgement packet to the source end to inform the source end that there is an error in a packet transmission process, and sends a packet retransmission instruction to the source end. If no packet is lost, S4 is performed.

S4: Determine whether the packets are all received. If the packets are all received, S5 is performed; or if the packets are not all received, S1 is performed again.

S5: After the packets are all received, perform out-of-order resequencing based on packet sequence numbers carried in the packets, to restore an order of the cached packets.

S6: After the cached packets are sequenced, write the packets into a memory.

S7: The destination ends sends an acknowledgement packet to the source end.

Figure 15:
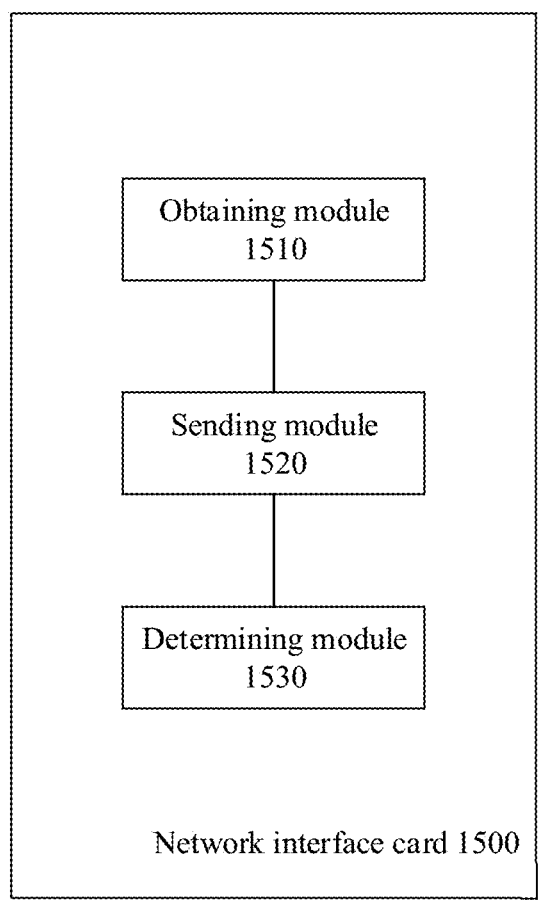
FIG. 15 is a schematic diagram of a function structure of a network interface card of a source end device according to an embodiment.

Based on the foregoing technical solution, referring to FIG. 15, an embodiment provides a network interface card 1500. The network interface card 1500 is located at a source end device that performs remote direct memory access RDMA, a source queue pair is configured on the network interface card 1500, and the source queue pair includes a send queue. The network interface card 1500 includes: an obtaining module 1510 configured to obtain Q data segments from a send queue of a first source queue pair in at least two source queue pairs; a sending module 1520 configured to: encapsulate the Q data segments to obtain Q packets, and send the Q packets, where each of the Q packets carries a first header and a second header, the first header carried in each packet is used to indicate a write address of the packet in a memory of a destination end device, the second header carried in each packet includes source port number information, source port number information in second headers carried in at least two of the Q packets is different, Q is a positive integer greater than or equal to 2, and the destination end device is a destination end device that performs RDMA; and a determining module 1530 configured to determine the write address of each of the Q packets in the memory of the destination end device based on a base address of a first data segment in the Q data segments and a length of each data segment.

For implementation of a function of the network interface card 1500 provided in this embodiment, refer to the packet transmission method shown in FIG. 5.

Figure 16:
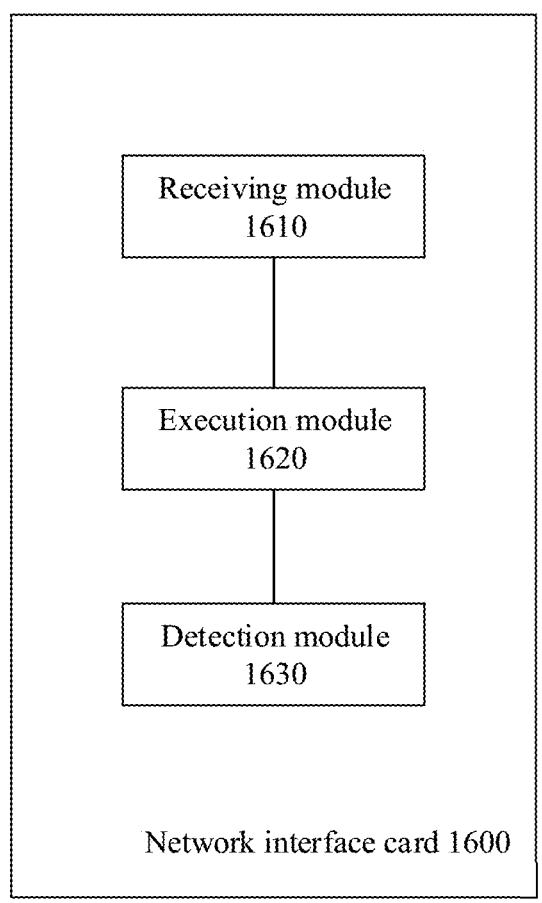
FIG. 16 is a schematic diagram of a function structure of a network interface card of a destination end device according to an embodiment.

Based on the foregoing technical solution, referring to FIG. 16, an embodiment provides another network interface card 1600. The network interface card 1600 is located at a destination end device that performs remote direct memory access RDMA, a destination queue pair is configured on the network interface card 1600, and the destination queue pair includes a receive queue. The network interface card 1600 includes: a receiving module 1610 configured to receive Q packets, where each packet carries a first header and a second header, the first header carried in each packet is used to indicate a write address of the packet in a memory of the destination end device, the second header carried in each packet includes source port number information, source port number information in second headers carried in at least two of the Q packets is different, and Q is a positive integer greater than or equal to 2; an execution module 1620 configured to separately store the Q packets from the destination queue pair in the memory of the destination end device based on the write address of each of the Q packets in the memory of the destination end device; and a detection module 1630 configured to: each time the receiving module receives one packet, record a packet sequence number carried in the currently received packet, and determine a packet sequence number of a next to-be-received packet based on the packet sequence number of the currently received packet; after a next packet is received, determine whether a packet sequence number of the next received packet is consistent with the packet sequence number of the next to-be-received packet, and if no, start a packet loss detection procedure; and send a packet retransmission instruction to a source end device if it is determined, through the packet loss detection procedure, that a packet loss occurs in a packet transmission process.

For implementation of a function of the network interface card 1600 provided in this embodiment, refer to the packet transmission method shown in FIG. 6.

Figure 17:
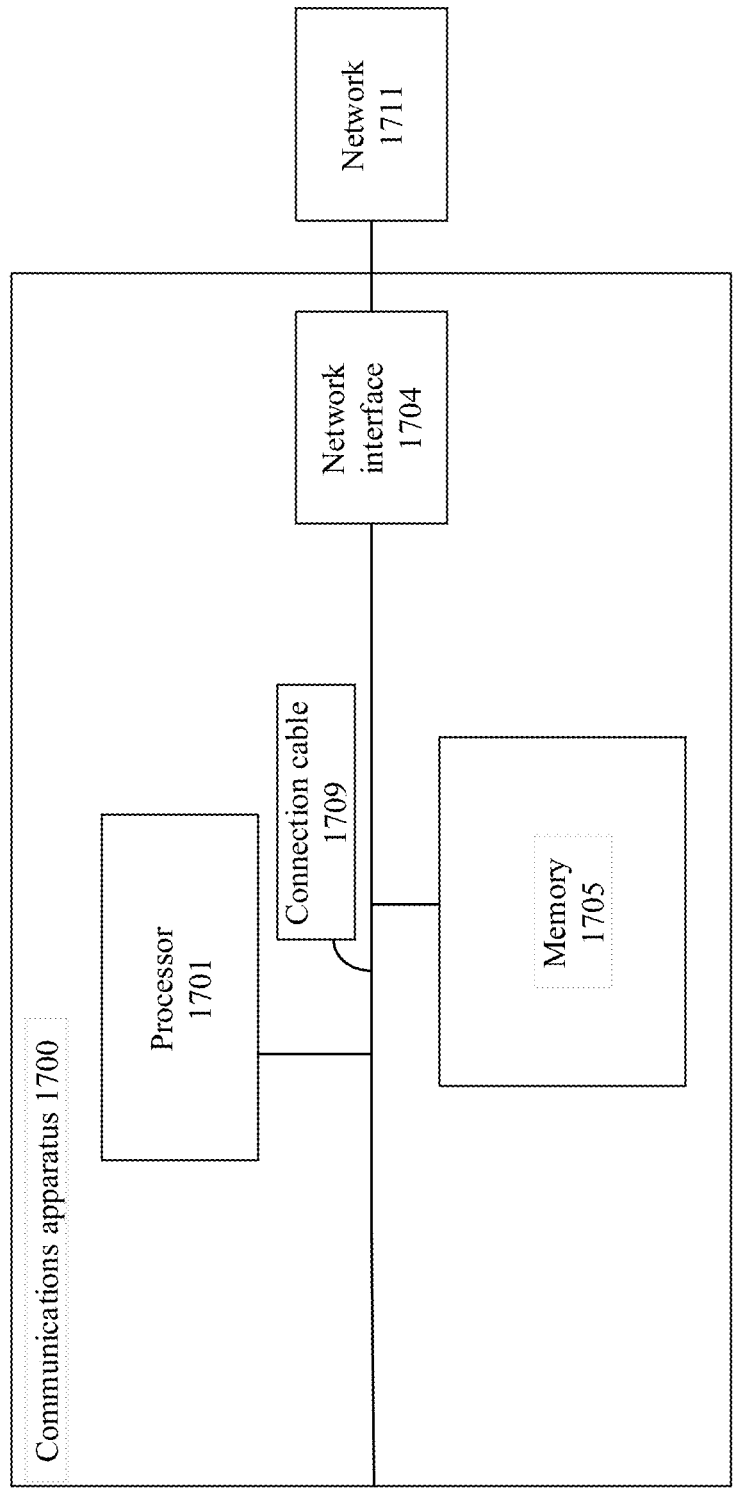
FIG. 17 is a schematic structural diagram of a communications apparatus according to an embodiment.

FIG. 17 is a schematic structural diagram of a communications apparatus 1700 according to an embodiment. The communications apparatus in this embodiment may be one specific implementation of the network interface card in the foregoing embodiments.

As shown in FIG. 17, the communications apparatus includes a processor 1701, and the processor 1701 is connected to a memory 1705. The processor 1701 may be calculation logic such as a central processing unit CPU, a field-programmable gate array (FPGA), or a digital signal processor (DSP), or any combination of the foregoing calculation logic. Alternatively, the processor 1701 may be a single-core processor or a multi-core processor.

The memory 1705 may be a RAM memory, a flash memory, a ROM memory, an EPROM memory, an EEPROM memory, a register, a hard disk, a removable hard disk, a CD-ROM, or a storage medium of any other form known in the art. The memory may be configured to store a program instruction. When the program instruction is executed by the processor 1701, the processor executes the method at the source end or the destination end in the foregoing embodiment.

A connection cable 1709 is configured to transmit information between components of the communications apparatus. The connection cable 1709 may use a wired connection manner or a wireless connection manner. The connection cable 1709 is further connected to a network interface 1704.

The network interface 1704 implements communication with another device or a network 1711 by using, for example but not limited to, a connection apparatus such as a cable or an electric strand. The network interface 1704 may be further wirelessly interconnected to the network 1711.

Some features of this embodiment may be completed/supported by the processor 1701 executing the program instruction in the memory 1705 or a software code. Software components loaded on the memory 1705 may be summarized in terms of function or logic, for example, function/logic modules such as the obtaining module and the sending module shown in FIG. 15 or function/logic modules such as the receiving module and the execution module shown in FIG. 16.

In an embodiment, after the memory 1705 loads the program instruction, the processor 1701 executes transactions related to the foregoing function/logic modules in the memory.

In addition, FIG. 17 is merely an example of the communications apparatus. The communications apparatus may include more or fewer components than those shown in FIG. 17, or have different component configuration manners. In addition, the components shown in FIG. 17 may be implemented by hardware, software, or a combination of hardware and software. For example, the communications apparatus may be implemented in a form of a chip. In this case, the memory and the processor may be implemented in one module. The instruction in the memory may be written into the memory in advance, or may be loaded by the processor during subsequent execution.

Figure 18:
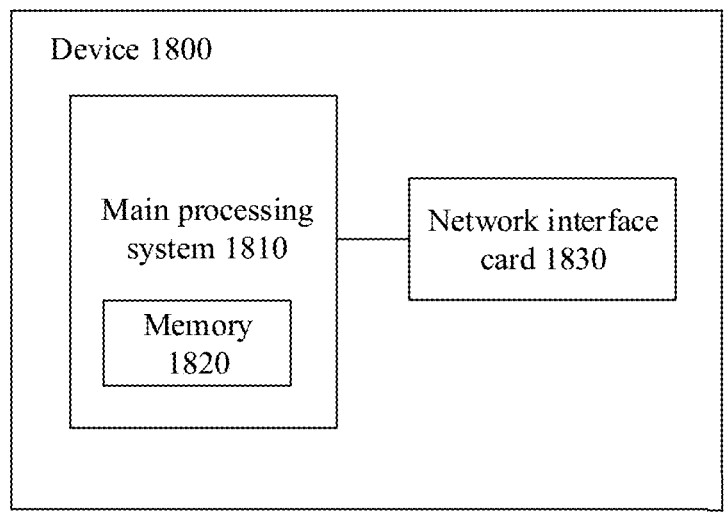
FIG. 18 is a schematic structural diagram of a source end device according to an embodiment.

An embodiment provides a device. As shown in FIG. 18, a device 1800 includes a main processing system 1810 and a network interface card 1830. The main processing system 1810 is configured to: process a service; and when service data needs to be sent to a destination end device, send the service data to a send queue of a source queue pair corresponding to service data in the network interface card 1830. The network interface card 1830 is configured to: obtain Q data segments from the send queue of the source queue pair corresponding to the service data, where the Q data segments belong to the service data; encapsulate the Q data segments to obtain Q packets, and send the Q packets, where each of the Q packets carries a first header and a second header, the first header carried in each packet is used to indicate a write address of the packet in a memory of the destination end device, the second header carried in each packet includes source port number information, source port number information in second headers carried in at least two of the Q packets is different, and Q is a positive integer greater than or equal to 2. The network interface card 1830 is further configured to determine the write address of each of the Q packets in the memory of the destination end device based on a base address of a first data segment in the Q data segments and a length of each data segment.

Figure 19:
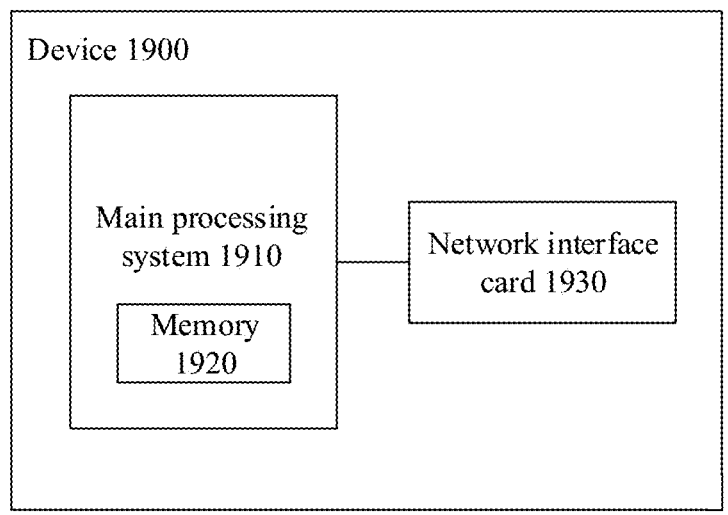
FIG. 19 is a schematic structural diagram of a destination end device according to an embodiment.

An embodiment further provides another device. As shown in FIG. 19, a device 1900 includes a main processing system 1910 and a network interface card 1930. The main processing system 1910 is configured to: obtain application data from a memory 1920 of the device 1900, and process a service based on the application data. The network interface card 1930 is configured to: receive application data implemented through Q packets, and write the received Q packets into the memory 1920. For a method for receiving the Q packets by the network interface card 1930, refer to the packet transmission method shown in FIG. 6.

An embodiment further provides a computer readable storage medium, including an instruction. When the instruction runs on a computer, the computer is enabled to execute the packet transmission method shown in FIG. 5.

An embodiment further provides another computer readable storage medium, including an instruction. When the instruction runs on a computer, the computer is enabled to execute the packet transmission method shown in FIG. 6.

What is claimed is:

1. A packet transmission method implemented by a source end device, the packet transmission method comprising:
    obtaining data segments;
    determining a write address of each of a plurality of packets in a memory of a destination end device based on a base address of a first data segment in the data segments and a length of each preceding data segment;
    encapsulating, based on determining the write address, each of the data segments to obtain one of the packets, wherein each of the packets comprises a first header and a second header, wherein the first header indicates the write address, wherein the second header comprises source port number information, wherein at least two of the packets comprise different source port number information when a preset quantity of packets has been sent, wherein the different source port number information is configured to prompt a router to select different forwarding paths for the packets based on a hash value of 5-tuple information, wherein the router is different from the source end device, and wherein the preset quantity is greater than one; and
    sending the packets.

2. The packet transmission method of claim 1, further comprising further encapsulating each of the data segments based on currently configured source port number information.

3. The packet transmission method of claim 1, further comprising classifying the data segments into groups, wherein the groups comprise a first group and a second group, wherein the packets corresponding to the first group comprise first source port number information, and wherein the packets corresponding to the second group comprise second source port number information.

4. The packet transmission method of claim 1, wherein each of the packets further comprises a packet sequence number indicating a sending order of a packet.

5. The packet transmission method of claim 1, wherein the data segments are from a set of application data associated with a single work request.

6. The packet transmission method of claim 1, wherein the preset quantity is variable.

7. The packet transmission method of claim 1, wherein the different source port number information is configured to obtain different paths based on a hash algorithm.

8. The packet transmission method of claim 2, further comprising further sending each of the packets upon their encapsulation.

9. The packet transmission method of claim 8, further comprising updating configured source port number information of a group of the packets upon encapsulation of the group.

10. A packet transmission method implemented by a destination end device, the packet transmission method comprising:
    receiving packets in a sequential manner, wherein the packets comprise a first packet with a first packet sequence number and a second packet with a second packet sequence number, wherein the packets are based on data segments from a set of application data forming a single work request for execution by a queue pair (QP) of a network interface card, wherein each of the packets comprises a first header, a second header, and a packet sequence number indicating a sending order of a packet, wherein the first header indicates a write address of the packet in a memory of the destination end device, wherein the second header comprises source port number information, and wherein at least two of the packets comprise different source port number information;
    storing each of the packets upon their receipt, in the memory, and based on the write address;
    setting, based on a currently-received packet sequence number of a currently-received packet, a bitmap bit representing the currently-received packet to be valid, wherein the currently-received packet sequence number and the bitmap bit are different;
    setting a head pointer of a bitmap to point to the bitmap bit;
    determining, based on the currently-received packet sequence number, whether the currently-received packet corresponds to a tail bitmap bit to which a tail pointer points;
    updating, when the currently-received packet corresponds to the tail bitmap bit, a pointing direction of the tail pointer to point to a first bitmap bit in invalid bitmap bits following the bitmap bit;
    recording the first packet sequence number upon receiving the first packet;
    determining, based on the first packet sequence number, a next-to-be-received packet sequence number of a next to-be-received packet;
    determining whether the next-to-be-received packet sequence number and the second packet sequence number are the same; and
    starting a packet loss detection procedure when the next-to-be-received packet sequence number and the second packet sequence number are not the same,
    wherein the packet loss detection procedure comprises sending a packet retransmission instruction to a source end device.

11. The packet transmission method of claim 10, wherein determining whether the next-to-be-received packet sequence number and the second packet sequence number are the same comprises determining, based on the second packet sequence number, whether the tail pointer points to a second bitmap bit corresponding to the second packet.

12. The packet transmission method of claim 10, wherein the packet loss detection procedure further comprises starting a timer for a timed packet corresponding to the tail bitmap bit.

13. The packet transmission method of claim 10, wherein the packet loss detection procedure further comprises determining whether a head bitmap bit to which the head pointer points exceeds a predetermined value.

14. The packet transmission method of claim 10, wherein the packet retransmission instruction comprises a packet sequence number of a packet corresponding to the tail bitmap bit.

15. The packet transmission method of claim 10, further comprising performing out-of-order resequencing of the packets based on packet sequence numbers (PSNs) of the packets.

16. The packet transmission method of claim 12, wherein the packet loss detection procedure further comprises determining that the timed packet is lost when the pointing direction does not change after the timer expires.

17. The packet transmission method of claim 13, wherein the packet loss detection procedure further comprises determining that a packet corresponding to a bitmap bit between the head bitmap bit and the tail bitmap bit is lost when the head bitmap bit exceeds the predetermined value.

18. The packet transmission method of claim 14, wherein the packet retransmission instruction requests that the source end device resend all packets following the packet.

19. A network interface card for implementation in a source end device and comprising:
a source end memory configured to store instructions; and
a processor coupled to the source end memory and configured to execute the instructions to:
obtain data segments;
determine a write address of each of a plurality of packets in a memory of a destination end device based on a base address of a first data segment in the data segments and a length of each preceding data segment;
encapsulate, based on determining the write address, each of the data segments to obtain one of the packets, wherein each of the packets comprises a first header and a second header, wherein the first header indicates the write address, wherein the second header comprises source port number information, wherein at least two of the packets comprise different source port number information when a preset quantity of packets has been sent, wherein the different source port number information is configured to prompt a router to select different forwarding paths for the packets based on a hash value of 5-tuple information, wherein the router is different from the source end device, and wherein the preset quantity is greater than one; and
send the packets.

20. The network interface card of claim 19, wherein the processor is further configured to further encapsulate each of the data segments based on currently configured source port number information.

21. The network interface card of claim 20, wherein the processor is further configured to further send each of the packets upon their encapsulation.

22. The network interface card of claim 21, wherein the processor is further configured to update configured source port number information of a group of the packets upon encapsulation of the group.

23. The network interface card of claim 19, wherein the processor is further configured to classify the data segments into groups, wherein the groups comprise a first group and a second group, wherein the packets corresponding to the first group comprise first source port number information, and wherein the packets corresponding to the second group comprise second port number information.

24. The network interface card of claim 19, wherein each of the packets further comprises a packet sequence number indicating a sending order of a packet.

25. The network interface card of claim 19, wherein the data segments are from a set of application data associated with a single work request.

26. The network interface card of claim 19, wherein the preset quantity is variable.

* * * * *